US007836427B1

(12) United States Patent
Li et al.

(10) Patent No.: US 7,836,427 B1
(45) Date of Patent: Nov. 16, 2010

(54) TREE-BASED RULE COMPOSITION WITH NATURAL LANGUAGE INLINE EDITING

(75) Inventors: Jin Li, Sammamish, WA (US); Nathaniel E. Breskin-Auer, Seattle, WA (US); Alvaro De Matos Miranda Filho, Bellevue, WA (US); Udaya Kumar Bhaskara, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2042 days.

(21) Appl. No.: 10/611,639

(22) Filed: Jul. 1, 2003

(51) Int. Cl.
*G06F 9/44* (2006.01)
(52) U.S. Cl. .................. 717/117; 717/107; 717/108; 717/123
(58) Field of Classification Search .............. None
See application file for complete search history.

(56) References Cited

U.S. PATENT DOCUMENTS

| | | | |
|---|---|---|---|
| 5,423,041 A * | 6/1995 | Burke et al. ............. 717/117 |
| 5,923,328 A | 7/1999 | Griesmer | |
| 6,029,147 A | 2/2000 | Horadan et al. | |
| 6,268,852 B1 | 7/2001 | Lindhorst et al. | |
| 6,337,696 B1 | 1/2002 | Lindhorst et al. | |
| 6,448,985 B1 | 9/2002 | McNally | |
| 6,496,208 B1 | 12/2002 | Bernhardt et al. | |
| 6,598,219 B1 | 7/2003 | Lau | |
| 7,287,227 B2 * | 10/2007 | Ries et al. ............. 715/741 |
| 2004/0073511 A1 * | 4/2004 | Beaumont et al. ............. 705/42 |

OTHER PUBLICATIONS

W.E. Bennett, S.J. Boies, J.D. Gould, S.L. Greene, and C.F. Wiecha. Transformations on a Dialog Tree: Rule-based Maping of Content to Style, Proceedings of the 2nd annual ACM SIGGRAPH Symposium, pp. 67-75, 1989.

Stuart Pook, Eric Lecolinet, Guy Vaysseix, and Emmanuael Barillot. Context and Interaction in Zoomable User Interfaces, Proceedings of the Working Conference on Advanced Visual Interfaces, pp. 227-231, 2000.

* cited by examiner

*Primary Examiner*—Chuck O Kendall
(74) *Attorney, Agent, or Firm*—Workman Nydegger

(57) ABSTRACT

A system, method and user interface facilitating hierarchical (e.g., tree-based) rule composition with natural language inline editing. For example, the system can combine a familiar hierarchical structure, such as a computer tree, and inline editing of natural language based logical expression(s) to provide a general purpose logical expression builder. In one example, the system facilitates construction and/or editing of business rule(s) based, at least in part, upon parameterized format string definition(s) and composable vocabulary definition(s).

The system includes a rule composer and a display component. The rule composer facilitates creation, modification and/or viewing of a rule, for example, based upon a user input. The display component displays hierarchical information associated with the rule.

30 Claims, 48 Drawing Sheets

TREE-BASED RULE COMPOSITION WITH NATURAL LANGUAGE INLINE EDITING

TECHNICAL FIELD

The present invention generally relates to modeling of complex business rule(s) in a computer system. In particular, the present invention relates to a system and method for tree-based rule composition with natural language inline editing.

BACKGROUND OF THE INVENTION

Electronic commerce (e.g., e-commerce and e-business) has revolutionized business practices by providing an efficient, reliable and cost-effective medium for business transactions. This evolution has fueled a growing trend towards eliminating paper transactions and conducting a large volume of business electronically. Many businesses have already shifted paradigms and are conducting a substantial portion of their business via networks (e.g., the Internet, virtual private networks and/or intranets).

One advantage of conducting e-business is that it provides a business with a capability to efficiently transmit and receive information from essentially anywhere and at any time. The impact of such accessibility has provided business relationships with markets that were once unavailable, world-wide visibility, increased competition within markets, quality improvements, "true" market driven prices, increased buyer/seller choice, decreased operational costs through mitigating overhead such as paper products, and diminished paper waste.

The robustness of e-business continues to progress with technological advances in the electrical/electronic and software fields. Such advances provide improved communication devices and improved user-friendly applications. In addition, the availability and affordability of computerized systems and e-business software that can be executed thereon facilitates a growing movement towards selling and purchasing goods via e-business. From the foregoing advances and trends, it has become foreseeable that the near future will demand business transactions to be conducted via e-business in order to compete within a business market.

Many e-business system(s) employ business rule(s) to facilitate transaction(s). Business rule(s) can vary from basic (e.g., transaction greater than $10) to very complex.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system, method and user interface facilitating hierarchical (e.g., tree-based) rule composition with natural language inline editing. For example, the system can combine a familiar hierarchical structure, such as a computer tree, and inline editing of natural language based logical expression(s) to provide a general purpose logical expression builder. A hierarchy structure, such as a computer tree, allows a user to quickly navigate through the hierarchy structure. Hierarchies generally include parent node(s), which can be expanded, and child node(s) that can be found within those parent nodes. A user can expand a parent node to view the contents of that node, or compress a parent node when the contents of the parent node are no longer need be visible. In one example, the system facilitates construction and/or editing of business rule(s) based, at least in part, upon parameterized format string definition(s) and composable vocabulary definition(s).

The system includes a rule composer and a display component. The rule composer facilitates creation, modification and/or viewing of a rule, for example, based upon a user input. The display component displays hierarchical information associated with the rule.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
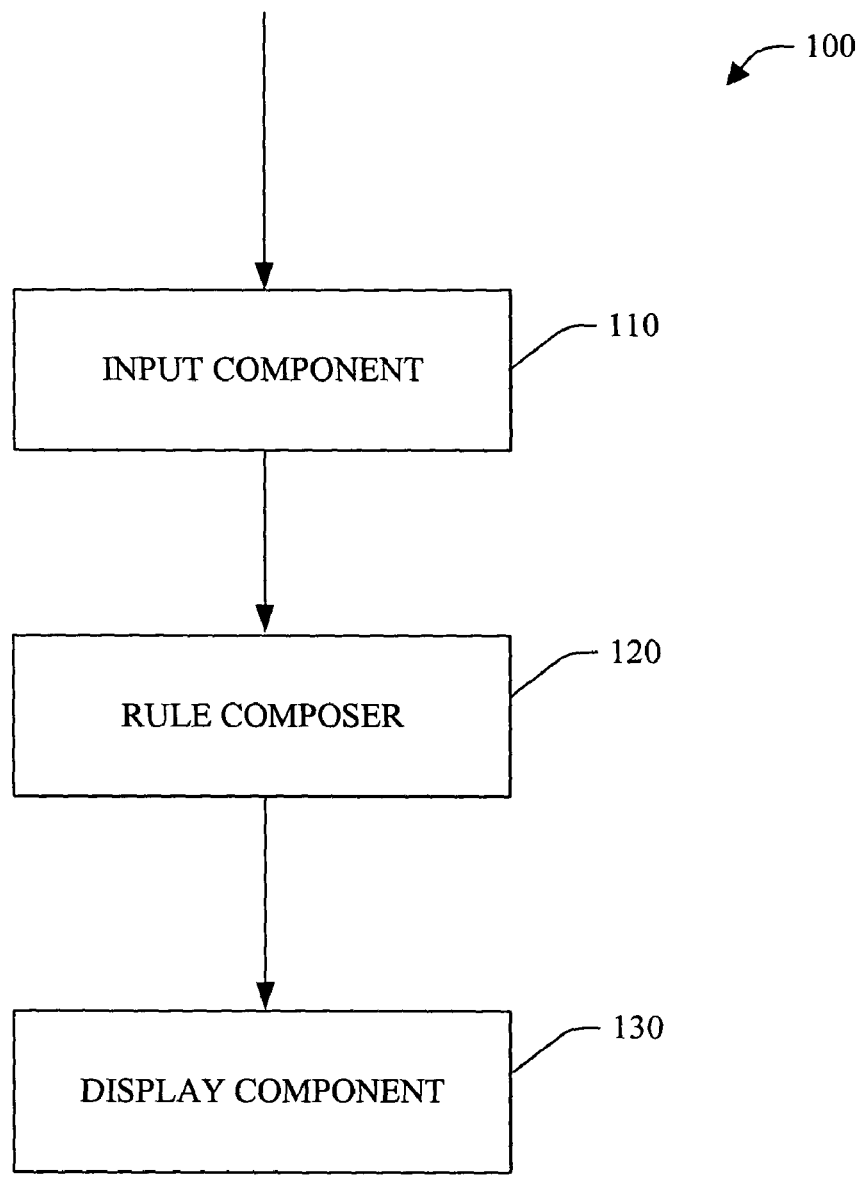
FIG. 1 is a block diagram of a system facilitating rule composition in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring to FIG. 1, a system 100 facilitating rule composition in accordance with an aspect of the present invention is illustrated. For example, the system 100 can combine a familiar hierarchical structure, such as a computer tree, and inline editing of natural language based logical expression(s) to provide a general purpose logical expression builder. A hierarchy structure, such as a computer tree, allows a user to quickly navigate through the hierarchy structure. Hierarchies generally include parent node(s), which can be expanded, and child node(s) that can be found within those parent nodes. A user can expand a parent node to view the contents of that node, or compress a parent node when the contents of the parent node are no longer need be visible. In one example, the system 100 facilitates construction and/or editing of business rule(s) based, at least in part, upon parameterized format string definition(s) and composable vocabulary definition(s).

The system 100 includes an input component 110, a rule composer 120 and a display component 130. The input component 110 receives instruction(s) and/or information from a user of the system 100. The input component 110 can include a computer keyboard, mouse and/or pointing device(s). The input component 110 can receive information from the user, for example, selection of a node, rule name and/or rule parameter(s). For example, in response to an instruction to expand a node, the rule composer 120 can provide information associated with child node(s) to be displayed by the display component 130.

The rule composer 120 facilitates creation, modification and/or viewing of a rule, for example, based upon a user input. The display component 130 displays hierarchical information associated with the rule.

Figure 2:
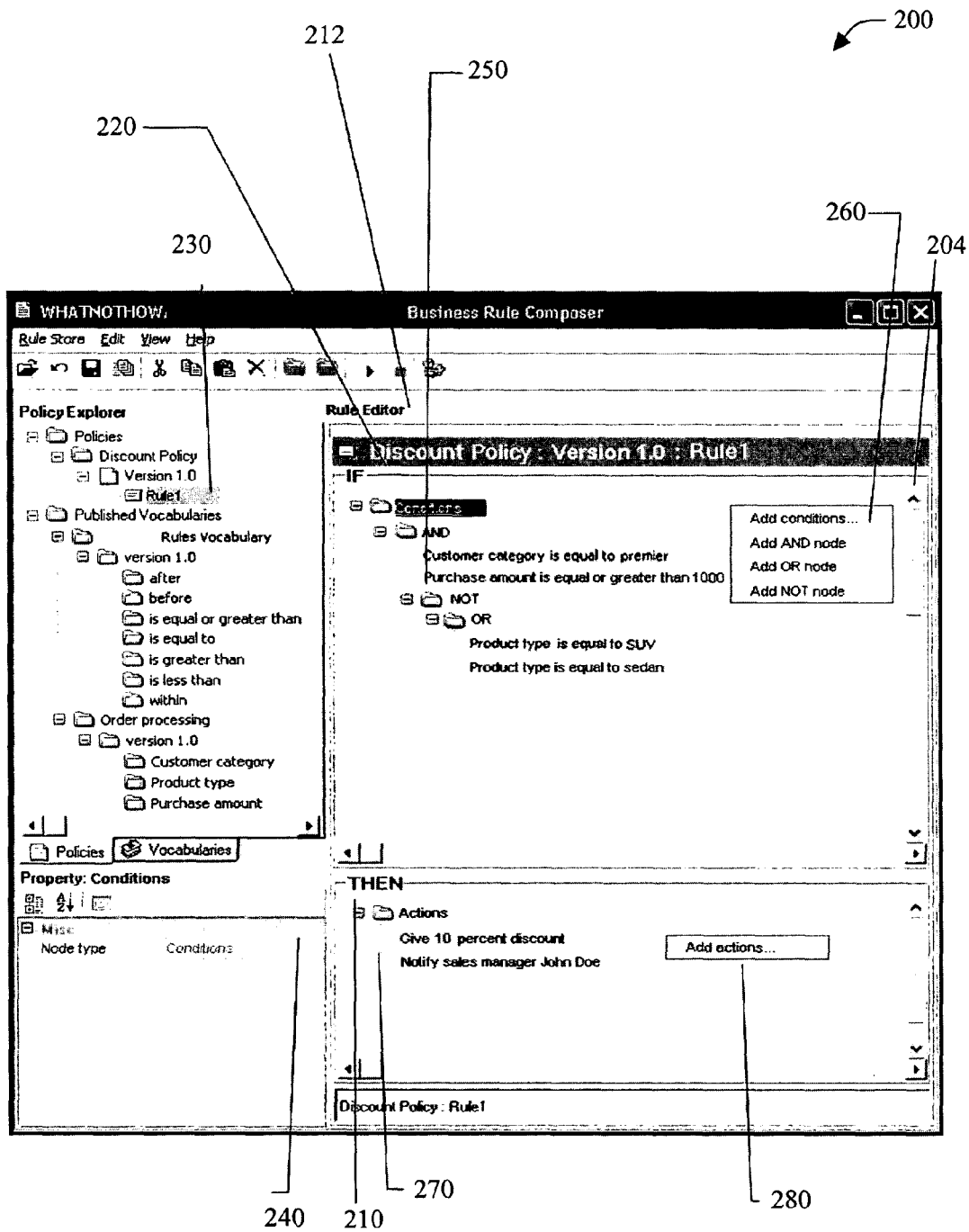
FIG. 2 is an exemplary user interface in accordance with an aspect of the present invention.

Turning to FIG. 2, an exemplary user interface 200 in accordance with an aspect of the present invention is illustrated. The user interface 200 facilitates rule composition, for example, facilitating creation, modification and/or viewing of rule(s) by a user.

The user interface 200 includes two splitting panels, a first splitting panel 204 and a second splitting panel 210 collectively referred to as a rule editor 212. The first splitting panel 204 facilitates building condition(s) associated with a rule. The second splitting panel 210 facilitates building action(s) associated with the rule. The first splitting panel 204 and/or the second splitting panel 210 can support vertical and/or horizontal scrolling.

The user interface 200 further includes a title bar 220 that displays a current policy name, version number and/or rule name. When the user selects a node 230, the current editing focus can be transferred (e.g., from "Rule 1") to that node. However, the node 230 (e.g., "Rule 1") can be accentuated (e.g., highlighted) to represent the parent-child relationship with editing focus in the rule editor 212.

Further, the user interface 200 can include a property window 240. The property window 240 can display property(ies) of a node 230 when it is selected. In this example, a node "conditions" having property "node type" with a value of "conditions" has been selected in the first splitting panel 204.

Next, the user interface 200 includes condition(s) 250. In this example, the conditions "AND", "NOT", and, "OR" are depicted. A context menu 260 can be provided for a node in the first splitting panel 204 and/or the second splitting panel 210. A user can invoke the context menu 260 and execute certain action(s). In this example, by right clicking the "conditions" node, a context menu providing options for "Add conditions", "Add AND node", "add OR node", and, "Add NOT node" is displayed (e.g., a "conditions" node can not be cut or deleted).

A list of actions 270 is also provided. In this example, the list of actions is represented using tree control, with one level under the root node (action) (e.g., each action is a leaf node). A second context menu 280 is also displayed (as discussed previously). In this example, the "actions" node cannot be deleted or cut.

Logical Relationship(s)

Returning to FIG. 1, the rule composer 120 can receive information associated with a rule based upon a hierarchical (e.g., tree-based) structure. For example, the information can include logical relationship(s) (e.g., "AND", "OR" and/or "NOT"). The AND, OR and/or NOT logical relationship can be represented in a tree structure (e.g., displayed via the display component 130). In one example, substantially all condition(s) at the same level must be in either AND or OR relationship, that is, AND and OR cannot be mixed at the same level. However, a sub-tree (e.g., child node) can be created to represent different logical relationship.

In the example depicted in FIG. 2, four conditions are depicted:

C1: Customer category is equal to premier

C2: Purchase amount is equal or greater than 1000

C3: Product type is equal to SUV

C4: Product type is equal to sedan

The Conditions tree can be rewritten using parenthesizes for grouping:

C1 and C2 and not (C3 or C4)

C1, C2, not (C3 or C4) is at the first level, which are connected using AND operator. C3, C4 is at the second level, which are connected using OR relationship.

In another example, the tree can be very deep in terms of the number of levels to represent complex AND/OR/NOT relationship(s). For example:

C1 and (C2 or (NOT(C3) and C4)) and C5

This expression has four levels deep with only five conditions.

Using parenthesizes can be error-prone, even to a developer. Thus, a tree representation of AND/OR/NOT as employed in an aspect of the present invention can be better in terms of usability, readability and/or scalability.

Further, NOT is unary logical operator. In one example, a user can add negation to a single condition and/or to a group of conditions. Thus, placing the condition or a group of conditions under a NOT node can represent both cases in a tree structure.

Vertical and/or Horizontal Scrolling

In accordance with an aspect of the present invention, scrolling can be employed with the system 100. Scrolling facilitates a user's ability to view substantially all condition (s) and/or action(s) in a rule definition. For example:

(1) The display name of a condition or action can be very long so that it exceeds the panel limit on the right hand side;

(2) The level of AND/OR/NOT relationship can be very deep, such that it causes some conditions at the lower level to exceed the window limit on the right hand side; and/or (3) The number of conditions and actions can be large such that it exceeds the panel limit at the bottom.

Adjustable Splitting Panels

In one example, as discussed previously, a user interface can include a two splitting panels (e.g., a first splitting panel 204 and a second splitting panel 210). The two splitting panels can be divided vertically by a bar. Using a mouse to drag the bar down and up can adjust the size of the two splitting panels to facilitate usability of the interface.

Ordering of Condition(s) and/or Action(s)

In one example, the auto-shorting of tree view and list view is disabled. For example, the order of a logical expression or a subgroup of logical expressions in the tree view and the order of actions in the list view can be determined by the order of creation. This simplifies the drag and drop functionality of changing the order of predicates and actions within the Condition view and Action view.

Color Scheme

Figure 3:
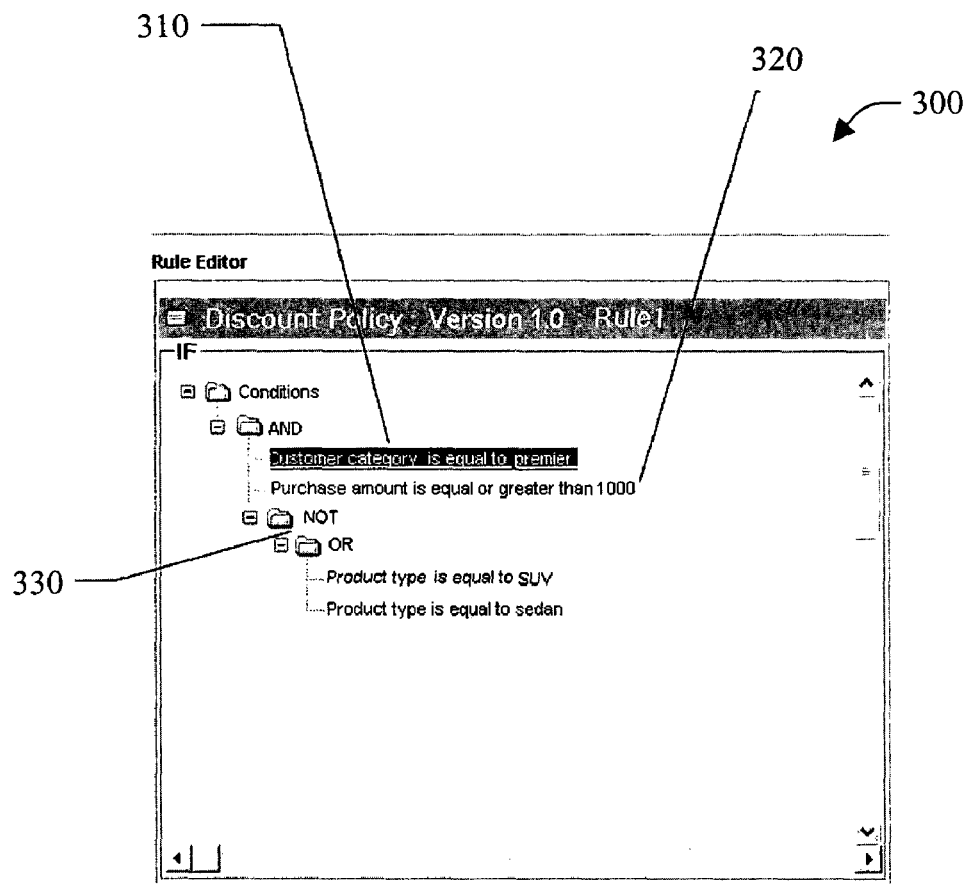
FIG. 3 is an exemplary user interface in accordance with an aspect of the present invention.

The system 100 can employ a color scheme to facilitate rule composition in accordance with an aspect of the present invention. Referring briefly to FIG. 3, an exemplary user interface 300 is illustrated. A selected condition and action 310 is depicted with a display name for parameter(s) shown in a first color with the remainder shown in a second color with the entire string underscored. In this example, a display string 320 for all the parameters or argument in a condition and action is shown in a third color with the rest of the text within the condition and action shown in a fourth color. Other node(s) 330 in the condition and action panel are shown in yet a fifth color. For example, if the other node(s) are selected, the text can be shown in a sixth color with the string underscored.

Icons and Text for Node(s)

Icon(s) (e.g., folder icon) can be used for substantially all folder nodes: Conditions, Actions, AND, OR, NOT. In one example, no icon is displayed for the leaf node: condition and action. Two or more nodes in the Condition tree view and Action list view can be permitted to have the same and/or similar text (e.g., text for nodes is localizable).

Exemplary Node types and corresponding text displayed (e.g., via the display component 130) is set forth in Table 1:

TABLE 1

| Node type | Text |
| --- | --- |
| Conditions | Conditions |
| AND operator | AND |
| OR operator | OR |
| NOT operator | NOT |
| Actions | Actions |
| Condition | <The display string of the condition> |
| Action | <The display string of the action> |

Node Ordering

In one example, the auto-sorting of the tree view and list view is disabled. The order of condition node(s), action node(s) and/or AND/OR/NOT node(s) can be determined by the order of creation (e.g., the latest created node is appended to the end).

Node Selection and Operation(s)

The user can select any of the node(s) in the Conditions and Actions panel. The user can take certain action(s) when a node is selected. In one example, once the node is selected, it is highlighted, and its property(ies) are shown in the property window (e.g., property window 240).

For example, multiple selections can be supported only at the leave node level:

(1) The user can select one or more conditions and actions at the same level.
(2) The user CANNOT select multiple folder nodes.
(3) The user CANNOT select conditions across the level.
(4) But the user CAN select a condition node and a sub-group node (if it is at the same level as the condition node).

For example, the user can use the mouse and/or keyboard (e.g., arrow keys) to select node(s) (see subheading "Mouse and Keyboard Operations" below). Exemplary operations are set forth in Table 2:

TABLE 2

| Operation | Applied Nodes | Semantics | UI consequences |
| --- | --- | --- | --- |
| Add conditions | Conditions AND OR NOT | Add a condition underneath | Launch the "Add Conditions" Dialog box; Append conditions to the end. |
| Add actions | Actions | Add an action underneath | Launch the "Add Conditions" dialog box; Append actions to the end. |
| Add AND node | Conditions AND OR NOT | Add the AND operator underneath | Append a new empty AND node to the end. |
| Add OR node | Conditions AND OR NOT | Add the OR operator underneath | Append a new empty OR node to the end. |
| Add NOT node | Conditions AND OR NOT | Add the NOT operator underneath | Append a new empty NOT node to the end. |
| Change to OR | AND OR NOT | Change the logical operator to OR | Change the node text to "OR" |
| Change to AND | AND OR NOT | Change the logical operator to AND | Change the node text to "AND" |
| Change to NOT | AND OR NOT | Change the logical operator to NOT | Chang the node text to "NOT" |
| Cut | Any nodes except Conditions and Actions nodes | Identical to "Copy" then "Delete" | Identical to "Delete" |
| Copy | Any nodes | Copy all the selected conditions to the clipboard (in the Conditions panel); Copy all the selected actions to the clipboard (in the Actions panel) | N/A |
| Paste | Any nodes except condition and action nodes | Paste conditions from the clipboard underneath (in the Conditions panel); Paste actions from the clipboard underneath (in the Actions panel) | Append conditions and actions to the end. |
| Delete | Any nodes except Conditions and Actions nodes | Delete the selected condition nodes or AND/OR/NOT nodes (in the Conditions panel); Delete the selected action nodes (in the Actions panel) | Launch a confirmation dialog box. All the selected condition nodes are removed; The AND/OR/NOT node and its child nodes are removed; All the selected action nodes are removed |

Node Context Menus and Main Menu

The user can select a node (e.g., right click) and bring up a context menu (e.g., context menu 260, context menu 280). Further, some operation(s) can be accomplished via Main Menu item(s) and/or a toolbar. Exemplary nodes and associated context menu, main menu and toolbar entry(ies) are set forth in Table 3:

TABLE 3

| Node | Context Menu | Main Menu | Toolbar |
|---|---|---|---|
| Conditions | Add conditions... | Cut (disabled) | Cut (disabled) |
| | Add AND node | Copy | Copy |
| | Add OR node | Paste (disabled if no conditions in the clipboard) | Paste (same as the main menu item) |
| | Add NOT node | Delete (disabled) | Delete (disabled) |
| Actions | Add actions... | Cut (disabled) | Cut (disabled) |
| | | Copy | Copy |
| | | Paste (disabled if no actions in the clipboard) | Paste (same as the main menu item) |
| | | Delete (disabled) | Delete (disabled) |
| AND/OR/ NOT | Add conditions... | Cut | Cut |
| | Add AND node | Copy | Copy |
| | Add OR node | Paste (disabled if no conditions in the clipboard) | Paste (same as the main menu item) |
| | Add NOT node Change to NOT Change to AND Change to OR | Delete | Delete |
| condition (multiple nodes) | Specify... * (disabled if multiple nodes selected) | Cut | Cut |
| | | Copy | Copy |
| | | Paste (disabled) | Paste (disabled) |
| | | Delete | Delete |
| action (multiple nodes) | Specify... * (disabled if multiple nodes selected) | Cut | Cut |
| | | Copy | Copy |
| | | Paste (disabled) | Paste (disabled) |
| | | Delete | Delete |

In Table 3, items denoted "Specify . . . *" is only available if the "Condition Definition" or "Action Definition" dialog box is used to specify condition and action.

Clipboard Operations

In one example, the clipboard operation only supports the latest pasted or cut items. The copied or cut conditions cannot be pasted into the Actions panel. The copied or cut actions cannot be pasted into the Conditions panel.

Drag and Drop

1. Between Policy Explorer and Rule Editor

Figure 4:
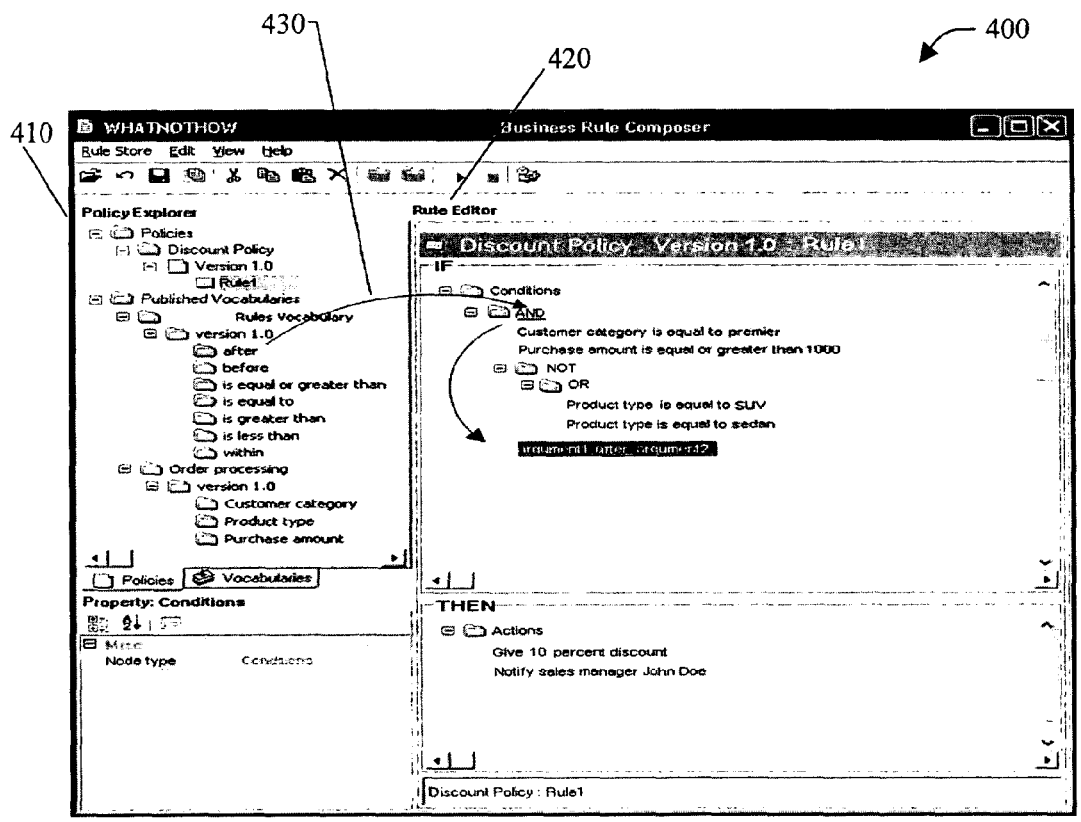
FIG. 4 is an exemplary user interface in accordance with an aspect of the present invention.

Turning briefly to FIG. 4, an exemplary user interface 400 in accordance with an aspect of the present invention is illustrated. In this example, a user is permitted to drag and drop vocabulary definitions from a Policy Explorer 410 to a Rule Editor 420, as depicted by action 430. Creation and/or specification of action(s) can be performed similarly. A vocabulary definition (e.g., which returns a Boolean value) can be employed to create the condition node.

Thus, in the example of FIG. 4, a vocabulary definition (e.g., "after") is selected in the Policy Explorer 410 (e.g., using a mouse). The vocabulary definition is dragged over a folder node, in this example, "AND". The "AND" text is underscored when it is active (e.g., the underscore disappears when the mouse pointer is moved). Upon user action (e.g., release of the mouse button), a new condition (e.g., "argument 1 after argument 2") is added to the end in the "AND" folder. The new condition is then selected and highlighted. Additionally and/or alternatively, to specify a vocabulary definition for a parameter, the parameter can be selected and a dialog box launched to either specify a literal value or select a vocabulary definition.

Figure 5:
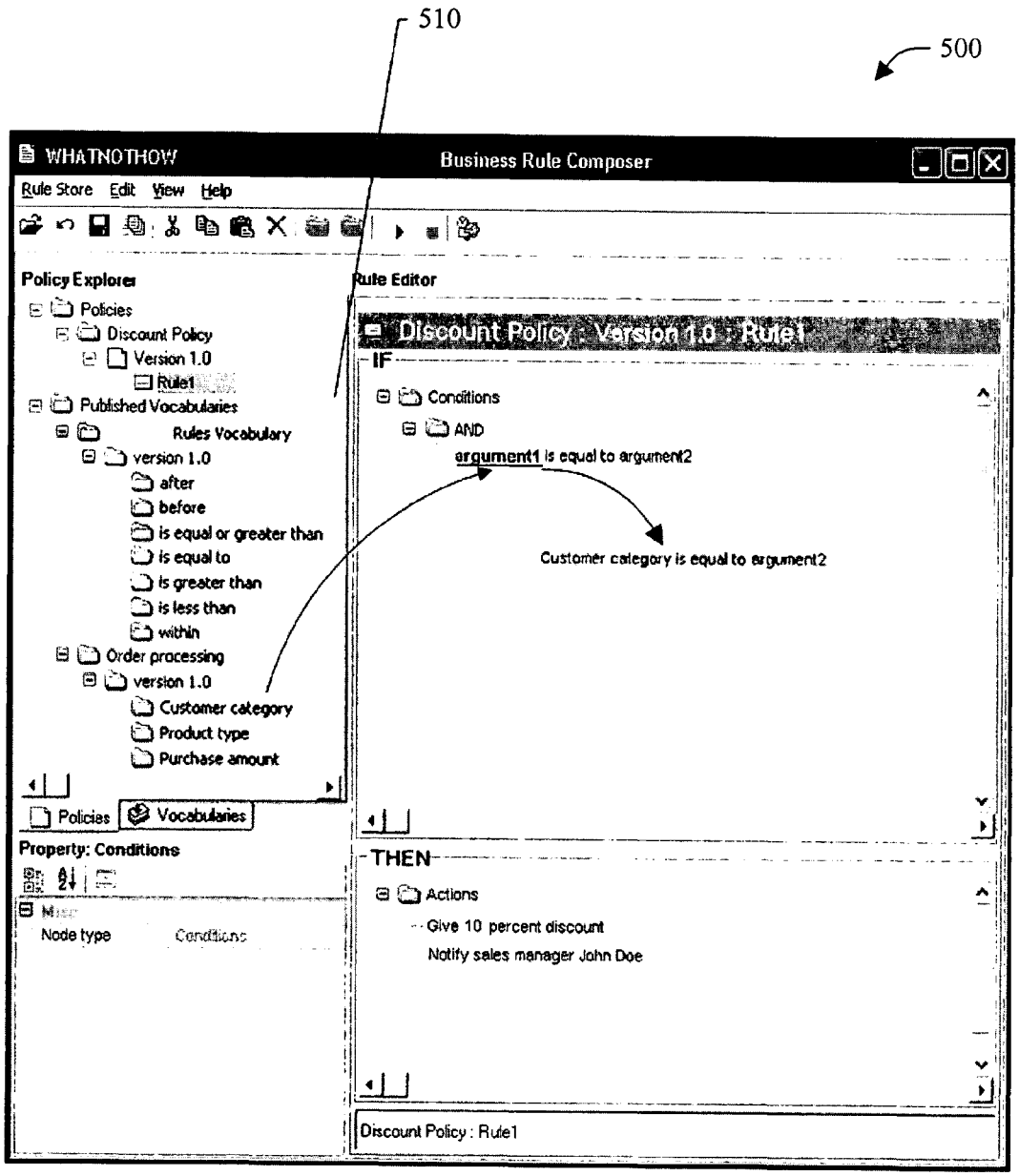
FIG. 5 is an exemplary user interface in accordance with an aspect of the present invention.

Next, referring to FIG. 5, an exemplary user interface 500 in accordance with an aspect of the present invention is illustrated. In this example, a vocabulary definition (e.g., "customer category") is selected in a policy explorer 510 (e.g., using a mouse). The vocabulary definition is dragged over a condition node (e.g., "argument 1 is equal to argument 2"). In this example, the parameter display string becomes bold and underscored; however if the mouse pointer moves away from the node, the underscore and bold style are removed. When the mouse button is released, the parameter is defined by the vocabulary definition and the display name for the condition is changed (e.g., "customer category is equal to argument 2"). Thereafter the condition is selected and highlighted.

2. Within Rule Editor

Several drag and drop capabilities within the Rule Editor can be provided:

(1) The user can drag and drop conditions, AND/OR/NOT nodes within the Conditions tree (the validation rules must be applied during the operation);

(2) The user can drag and drop actions within the Actions list;

(3) The drag and drop is not available among parameters of a condition and action (if the inline editing is implemented); and/or (4) The drag and drop can not happen between the Conditions and Actions panels.

Figure 6:
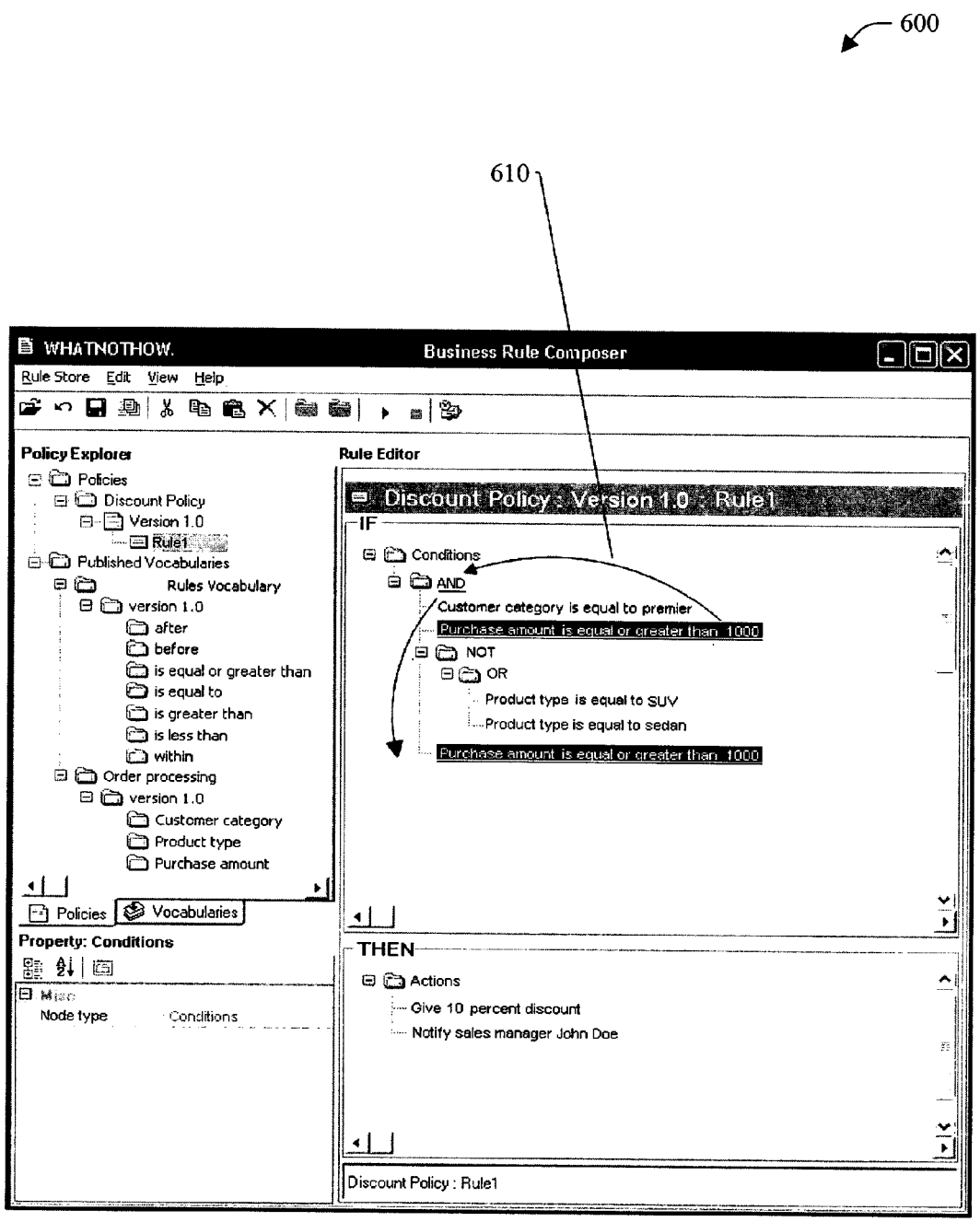
FIG. 6 is an exemplary user interface in accordance with an aspect of the present invention.

Referring briefly to FIG. 6, an exemplary user interface 600 in accordance with an aspect of the present invention is illustrated. The user interface 600 illustrates an example of drag and drop editing within a rule editor 610. In this example, a condition or AND/OR/NOT node is selected. The node is then dragged over a folder node (e.g., "AND"). The "AND" text is underscored (if the mouse pointer moves away from the node, the underscore is removed). When the mouse button is released, the condition or AND/OR/NOT node is moved from the original place to the end. The condition or AND/OR/NOT node is selected and highlighted.

Add Actions Dialog Box

Figure 7:
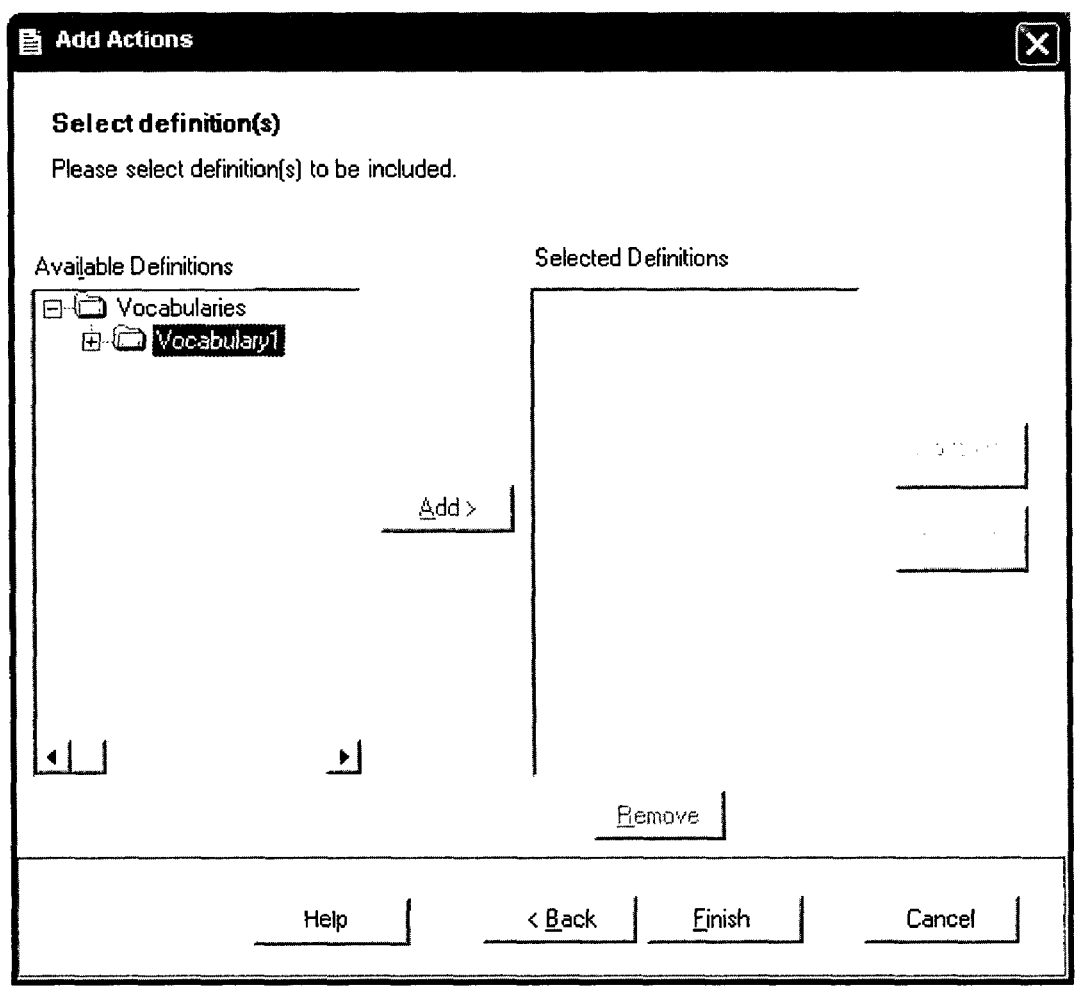
FIG. 7 is an exemplary user interface in accordance with an aspect of the present invention.

Turning to FIG. 7, an exemplary user interface 700 in accordance with an aspect of the present invention is illustrated. The user interface 700 illustrates an add actions dialog box. In this example, the add actions dialog box show the published vocabularies.

Add Conditions Dialog Box

Figure 8:
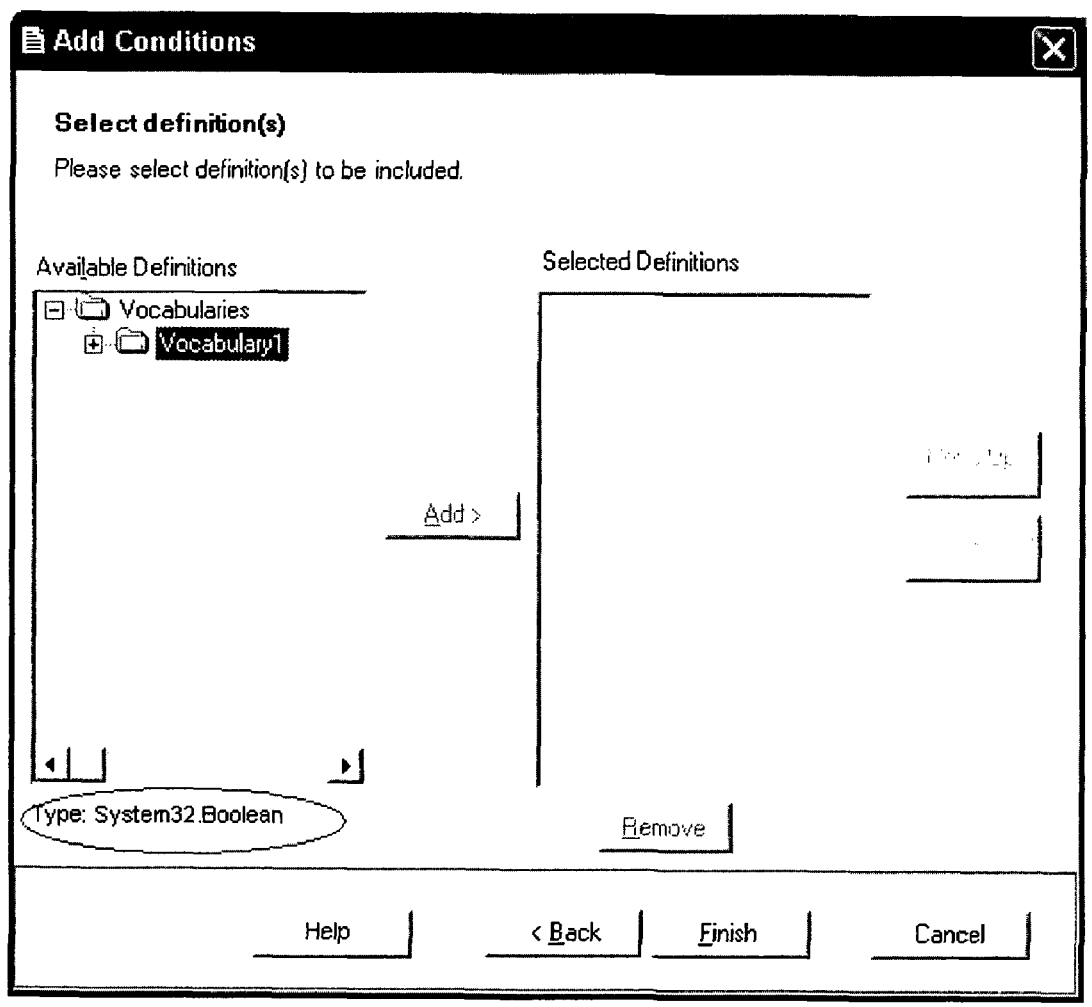
FIG. 8 is an exemplary user interface in accordance with an aspect of the present invention.

Referring to FIG. 8, an exemplary user interface 800 in accordance with an aspect of the present invention is illustrated. The user interface 800 illustrates an add conditions dialog box. In this example, the published vocabularies are depicted filtered by type 810 (e.g., "System32.Boolean").

Confirmation Dialog Box for Delete and Cut

Figure 9:
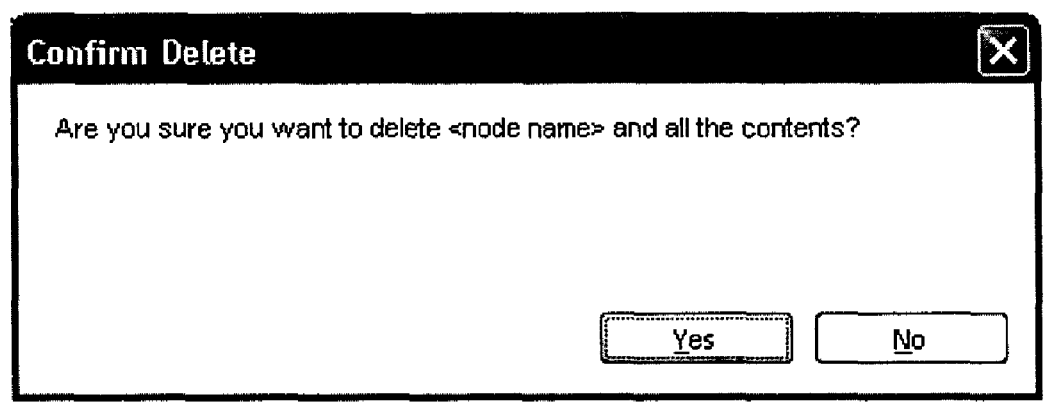
FIG. 9 is an exemplary user interface in accordance with an aspect of the present invention.

Next, turning to FIG. 9, an exemplary user interface 900 in accordance with an aspect of the present invention is illustrated. The user interface 900 depicts an confirm delete dialog box. In this example, if a user clicks "NO" button, the delete or cut operation is canceled. If the user clicks "YES" button, the delete or cut operation continues.

Condition/Action Editing

In accordance with an aspect of the present invention, editing of condition/actions which has one or more parameters can be performed by inline value editing (e.g., for each parameter) and/or via launching of a condition editing dialog box to specify the value (e.g., for each parameter).

If a parameter is free form (no constraints defined), it can either show the default prompt string and/or the display string the user defines in vocabulary definition. If a parameter is constrained, it can show the prompt string defined by the user in vocabulary definition.

With regard to condition/action inline editing, the condition/action node can represented as a string which is composed from the condition definition display name with parameter(s) shown using its own display names. In one example, once the user specifies a value for a parameter in the condition or action, the original context information is lost. For example, "<enter a value between 10 and 50> for a range, <select a stock name> for a set, <enter a name> for a free form parameter"—the constraint information and/or display name will be lost after the user specifies a value. However, to prompt the context information to the user, when the user moves the mouse over the parameter and lingers, a tooltip can appear and display the original display name for that parameter.

Figure 10:
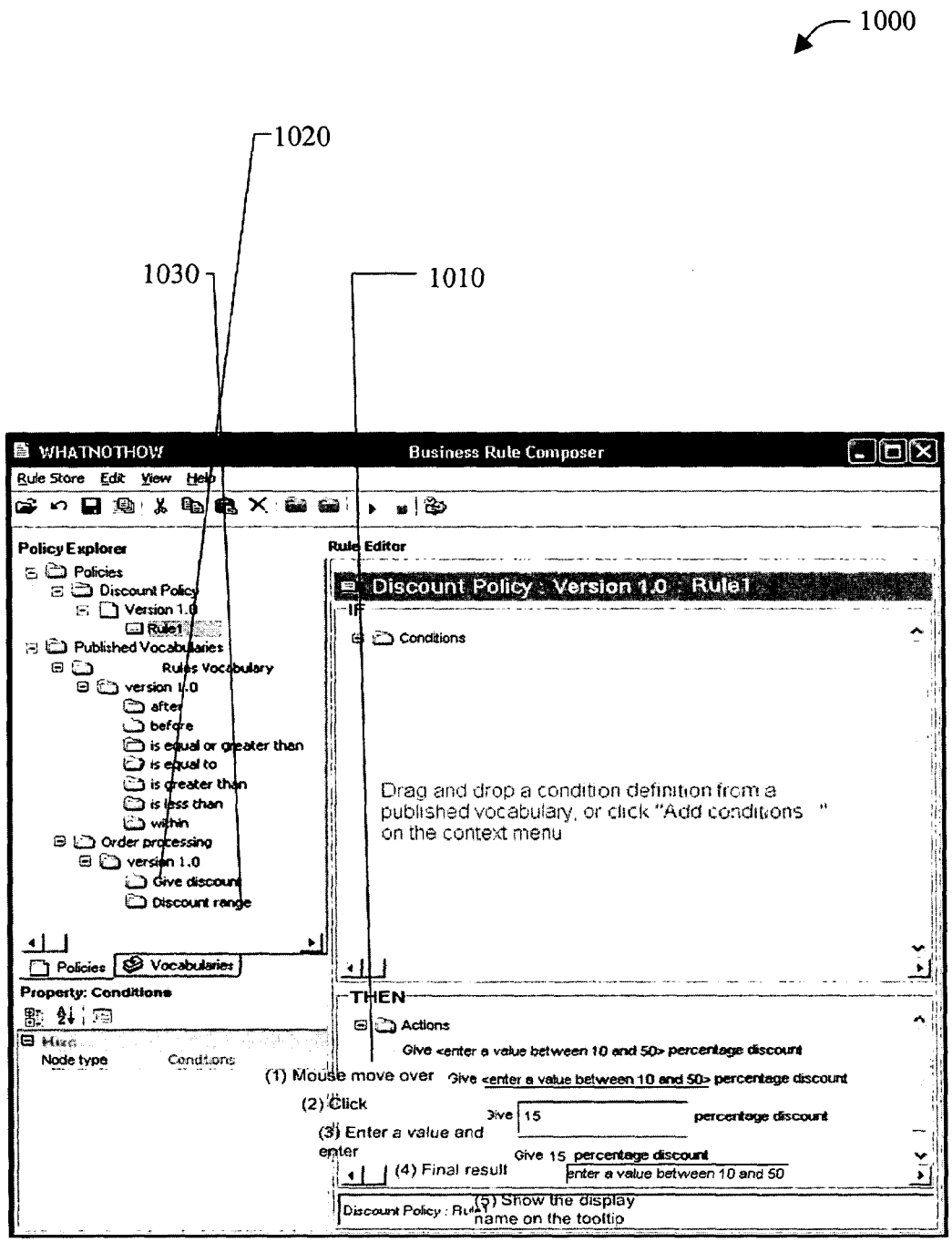
FIG. 10 is an exemplary user interface in accordance with an aspect of the present invention.

Turning to FIG. 10, an exemplary user interface 1000 in accordance with an aspect of the present invention is illustrated. The user interface 1000 can facilitate a user's editing of parameter(s) having a value in a range. In this example, when a mouse was moved over "<enter a value between 10 and 50> in an actions panel 1010, it was underscored. This was selected (e.g., clicked by mouse selection), and, a text box was provided. Also displayed are a "give discount" definition 1020 and a "discount range" definition 1030.

In this example, a user has entered the value "15". As the focus is changed (e.g., mouse moved), the rule editor can attempt to validate the entry. Had the entry value been incorrect, the user would have been prompted with a message box providing "Invalid entry" with the value not replacing the display name. If the entry is proper, the value is shown, "15" in this example. The value can then be cleared back to "<enter a value between 10 and 50>.

Figure 11:
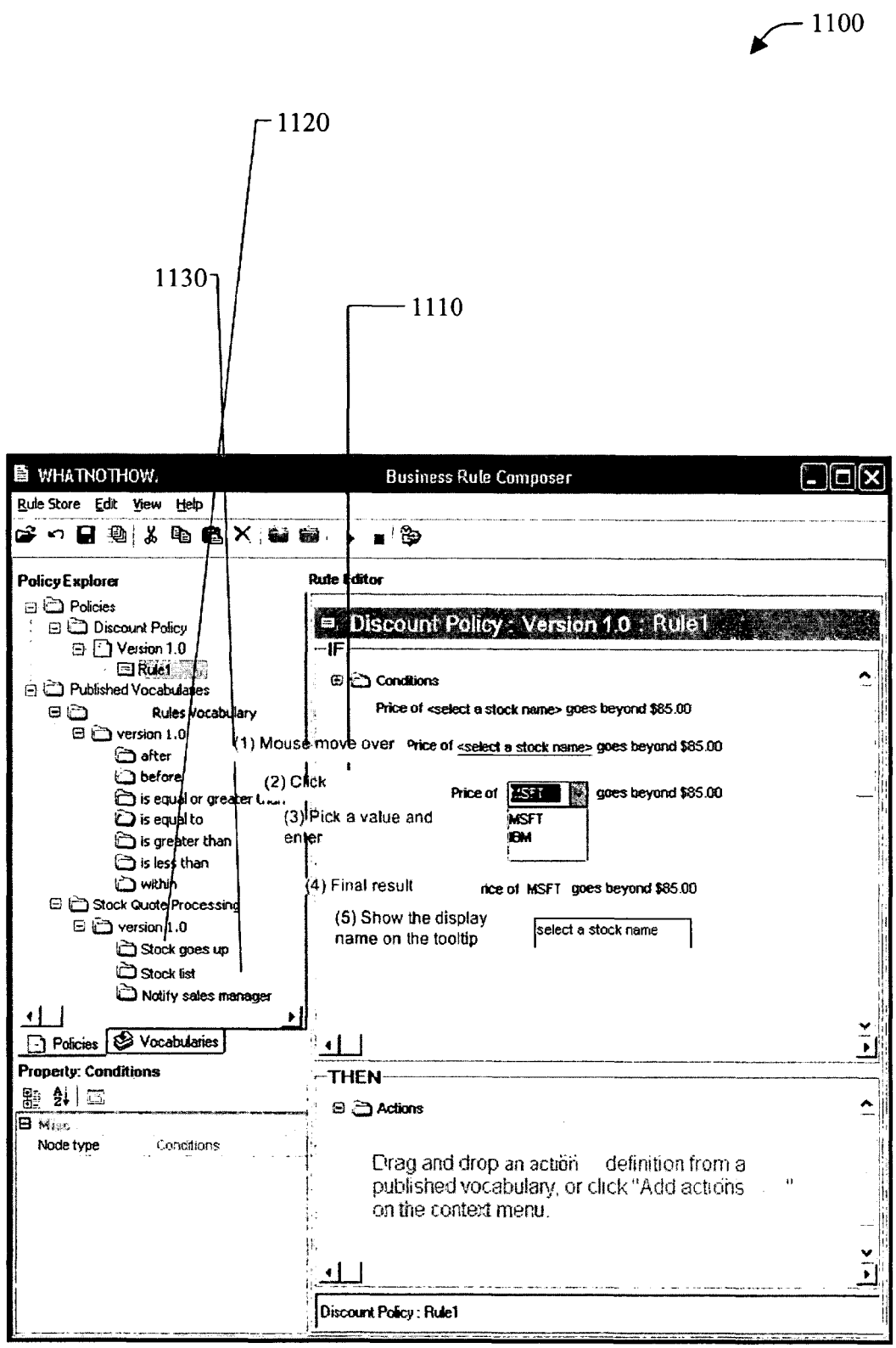
FIG. 11 is an exemplary user interface in accordance with an aspect of the present invention.

Next, referring to FIG. 11, an exemplary user interface 1100 in accordance with an aspect of the present invention is illustrated. The user interface 1100 can facilitate a user's editing of parameter(s) having a value in a set of value(s). In this example, a drop down box can facilitate selection of the parameter value from a set of values. Includes in the published vocabulary are "stock goes up" definition 1120 and "stock list" definition 1130.

Figure 12:
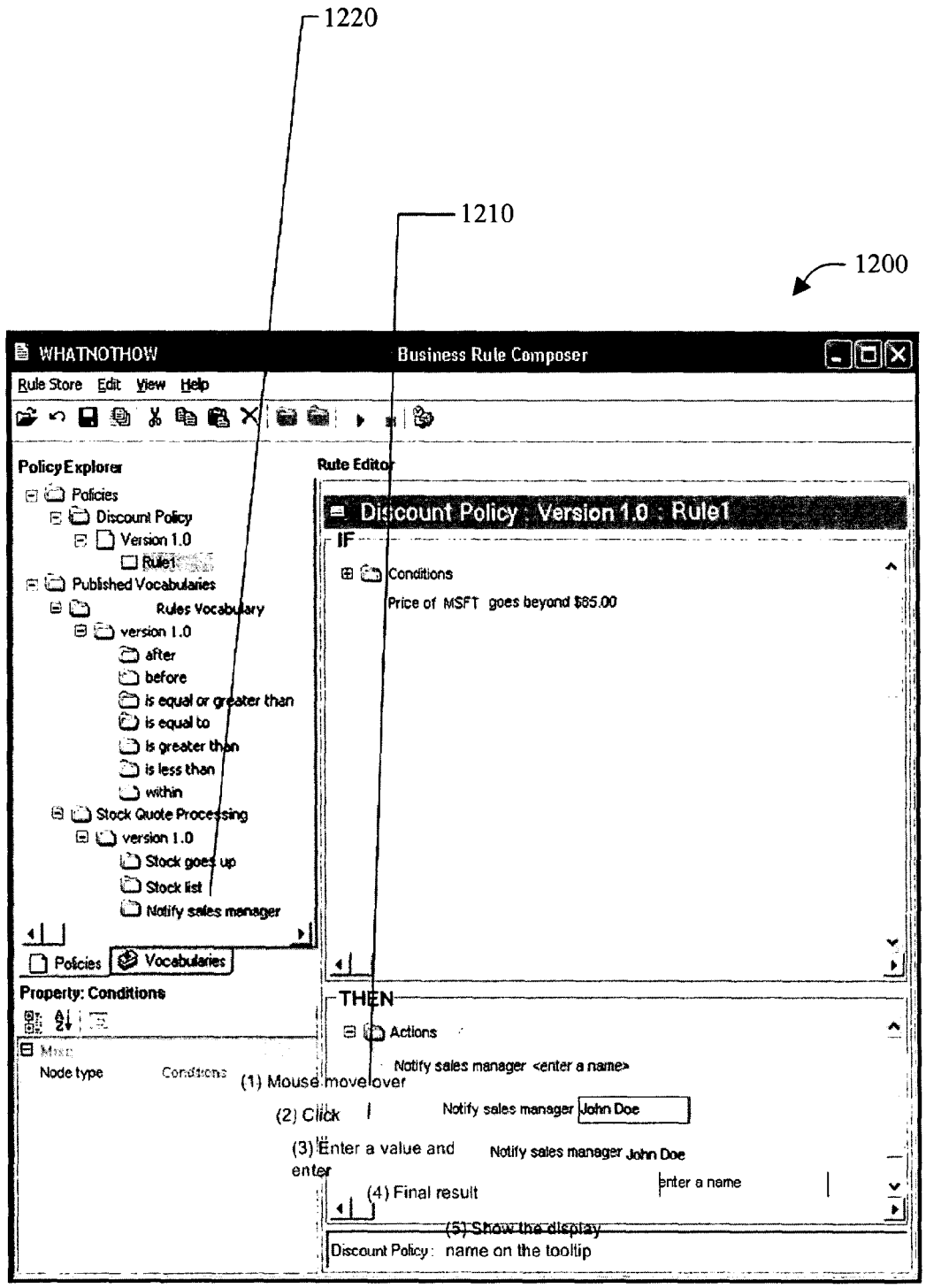
FIG. 12 is an exemplary user interface in accordance with an aspect of the present invention.

Turning to FIG. 12, an exemplary user interface 1200 in accordance with an aspect of the present invention is illustrated. The user interface 1200 facilitates inline editing of a value for an unconstrained parameter.

In this example, a user selects "<enter a name>" in the action panel 1210 associated with a "notify sales manager" definition 1220 and a text box appears. The user has entered "John Doe". When focus is changed (e.g., mouse moved), the entry is attempted to validated against the type. If the entry is valid, the display name is replaced, in this example, with "John Doe". If the entry is invalid or the entry is removed, the display name reverts to "<enter a name>".

With regard to vocabulary definitions that can be dragged and dropped, in one example, the definition the user can drag and drop over a free form argument in a condition or action must be fully specified at its second level (e.g., nesting parameter definition more than one level is not supported):

(1) A constant value, a range, a set of value, and/or
(2) A definition having a return type.
  (a) No parameters, or
  (b) With parameters fully specified (defined by a constant value).

In another example, second level parameter(s) are not defined (e.g., complex case).

Figure 13:
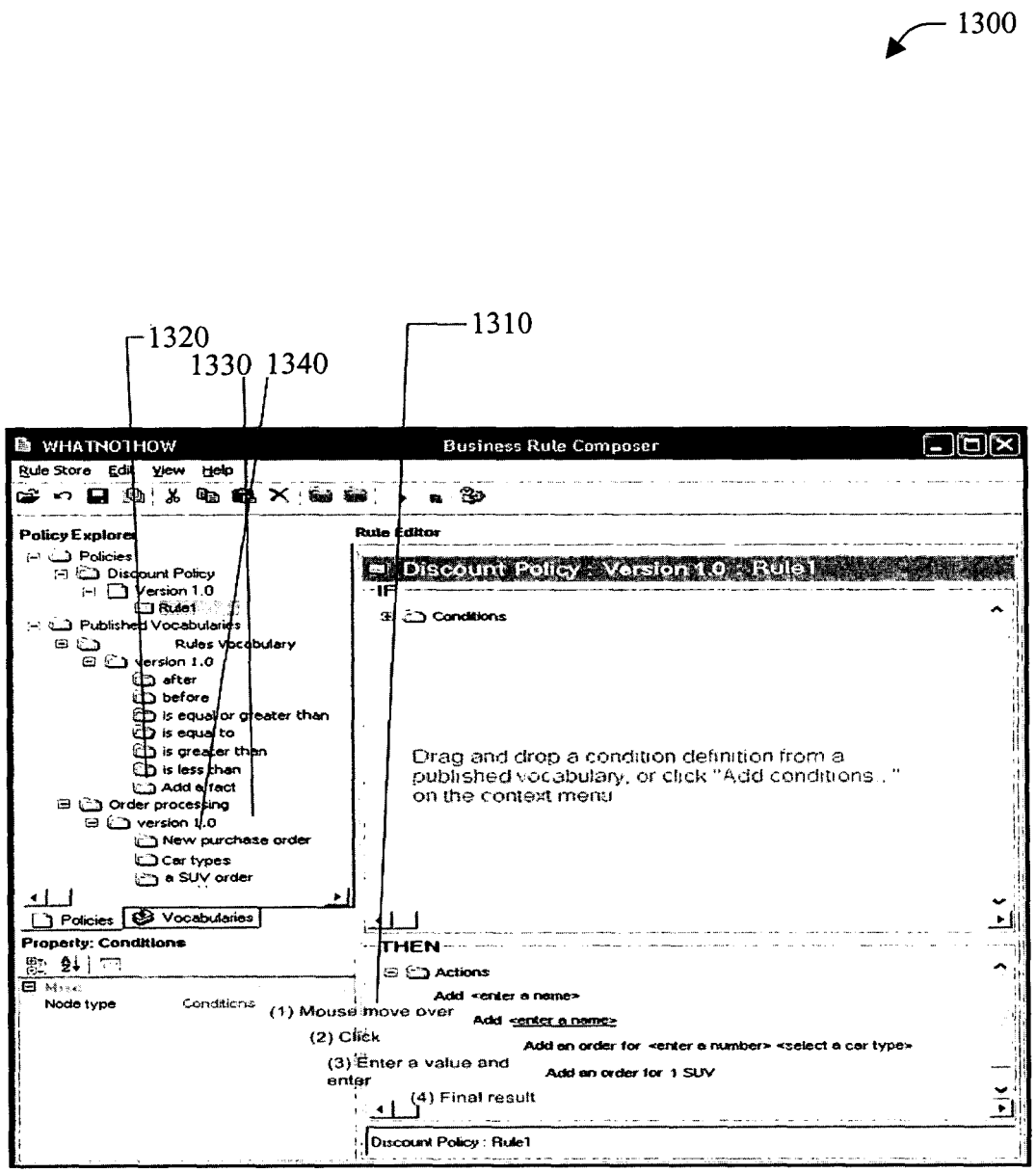
FIG. 13 is an exemplary user interface in accordance with an aspect of the present invention.

In this example, referring to FIG. 13, an exemplary user interface 1300 in accordance with an aspect of the present invention is illustrated. The user interface 1300 facilitates specification of a vocabulary definition for an unconstrained parameter in the situation in which second level parameter(s) are not defined (e.g., complex case). The user interface 1300 includes an action panel 1310, an "add a fact" definition 1320, an "order processing" definition 1330 and a "version 1.0" definition 1340.

In this example, if a user selects "<enter a name> in "Add <enter a name>", since it is not a literal type, an error message appears—"You cannot enter a value, however you can drag and drop a vocabulary definition here!". The user can drag and drop "New Car Order" over "enter a name".

Figure 14:
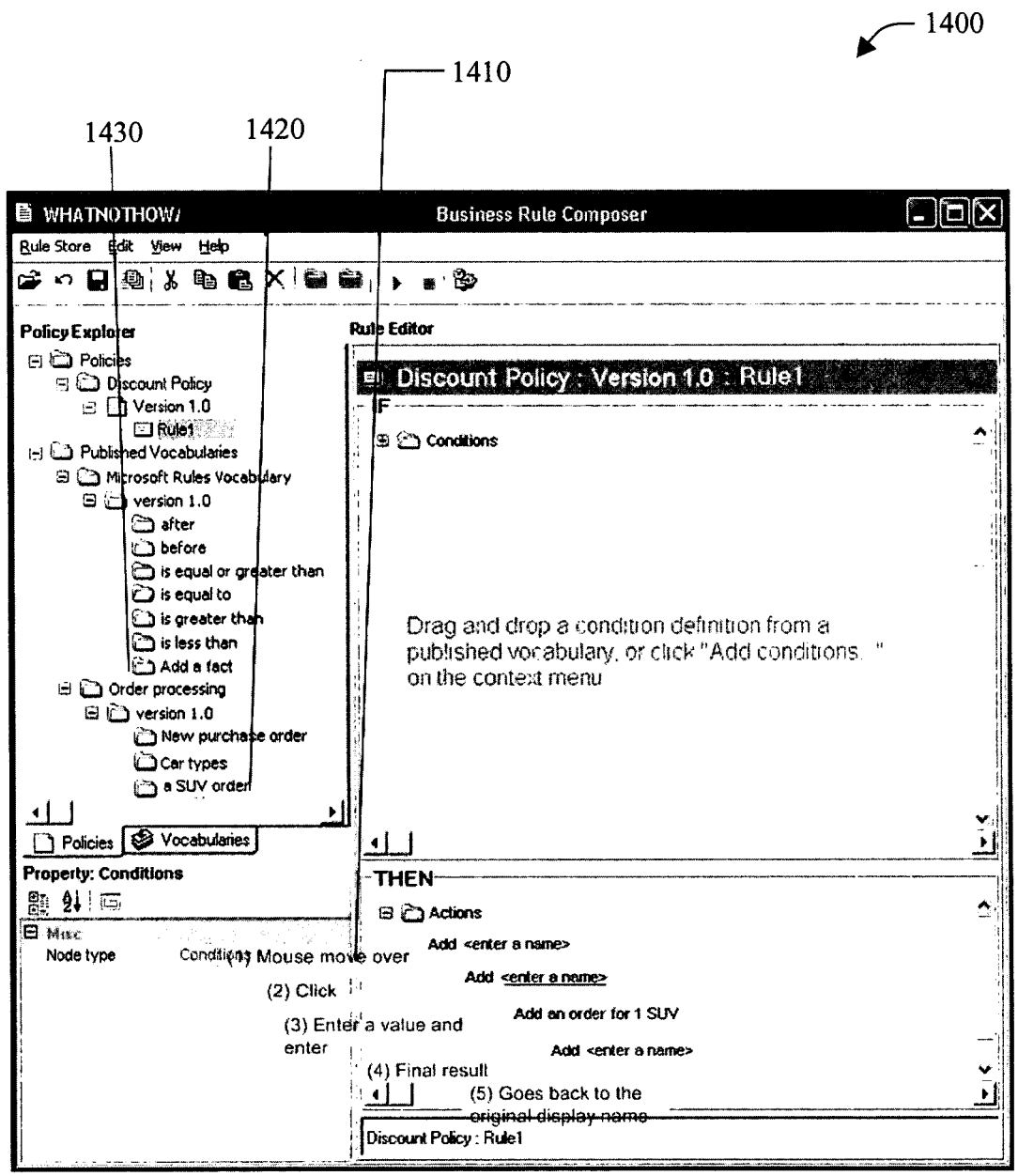
FIG. 14 is an exemplary user interface in accordance with an aspect of the present invention.

Turning to FIG. 14, an exemplary user interface 1400 in accordance with an aspect of the present invention is illustrated. The user interface 1400 illustrates a simpler case of the dragging and dropping of vocabulary definitions (e.g., where second level parameter(s) are fully specified). The user interface includes an action panel 1410, a "SUV order" definition 1420, and, an "add a fact" definition 1430.

In this example, a user drags and drops "an SUV order" over <enter a name>. If the type is compatible, the display name of "an SUV order" will replace <enter a name>. Thus, it becomes "Add an order for 1 SUV".

Type Compatible Issues in Condition/Action Definition

For user-defined condition and actions, its parameter type is defined during the vocabulary definition time. The type compatibility can be checked when the drag and drop occurs. If something is incorrect, the Rule Editor can prompt an error message "Invalid Type" and abort the operation. For some built-in condition or actions, arguments types may not defined. For example, the relational operators can be used by many types.

In one example, any types of parameter defined are allowed. Validation of the type compatibility is performed at the rule checking time. In another example, type checking is performed at the design time. When a first parameter is defined, those following parameters must be type compatible. Since some literal value can be recognized as many types (e.g., "true" can be recognized as a string or a Boolean value), a type conversion mechanism can be provided to handle special built-in operators.

In a third example, built-in operators are not provided and a user builds relational operator(s). In yet a fourth example, some operator(s) with typed parameter(s) (e.g., <enter a number> is equal to <enter a number>, <enter a string> is identical to <enter a string>, for both number and string types).

Value Entry and Type Validation

When a value for a parameter (e.g., single value and/or range) is entered in a condition or action, the value entered is validated against the parameter type. If the value is not recognized as a valid value for a given type (e.g., after the Rule Editor, tries to convert the value), the rule composer will display an error message in the tool tip in Rule Editor.

The format of some value could be locale-sensitive (e.g., datetime, decimal). The Rule Editor can use the current User Locale to validate the value. When a value is entered for a range, not only it must be recognized as the valid type, it also should be within the range.

Mouse and Keyboard Operations

Both Conditions and Actions panel support mouse and keyboard operations to manipulate those nodes and editing conditions/actions.

1. Design Surface Partition

To define the mouse operation clearly, the Conditions and Actions surface can be defined into several areas (e.g., which determine the UI reaction and user behaviors).

a. On top of a condition/action node
      i. On top of an argument;
      ii. On top of the rest display string
   b. On top of AND/OR/NOT node
   c. On top of Conditions/Actions node
   d. The rest part of design surface 2. Mouse Operations
   a. Mouse pointer
   b. Mouse move over
   c. Mouse click
   d. Drag and Drop 3. Keyboard Operations In one example, keyboard operation(s) implement substantially all the mouse functionality(ies).

Error Handling in Rule Editing

There are many situations in which a user can make mistakes during the policy composition, especially when the rule is very complicated. Thus, in accordance with an aspect of the present invention, the system 100 (e.g., rule composer 120) can detect mistake(s) and help the user take the proper action(s) to correct them. The rule composer UI (e.g., displayed via the display component 130) can information associated with handling of error(s).

In one example, the following rules are applied in condition and action editing:

1. Rules in Conditions Composition:

"Conditions" node should not be deleted.

"Conditions" node could be empty. In this case, it means always true.

Condition can only be vocabulary definition of a Boolean type.

"Conditions" node should have only one child node.

"AND"/"OR" node should have at least two child nodes (two operands).

"NOT" node should have only one child node.

All the parameters in conditions must be fully specified.

The value of every parameter must be valid according to the type.

The vocabulary definition used in a parameter must be type compatible.

The parameter values for built-in relational operator must be compatible.

2. Rules in Actions Composition:

"Actions" node should not be deleted.

"Actions" node could be empty. In this case, it means no operation(s) (e.g., noops).

Action can be vocabulary definition of any type.

All the parameters in actions must be fully specified.

The value of every parameter must be valid according to the type.

The vocabulary definition used in a parameter must be type compatible.

The parameter values for built-in relational operator must be compatible if it is used in actions clause.

Detection and Correction of Error(s)

Since there are many different ways by which the user can break these rules, the system 100 (e.g., rule composer 120) can attempt to detect these errors as early as possible when it happens.

In one example, at the end of an editing session, when the user tries to save the policy, if the conditions and actions part are still invalid, the rule composer will:

(1) Prompt the user "There are errors in rule definitions, please correct them before save the policy".

(2) Once the user clicks OK, the rule composer will auto-locate the first rule of the current policy which contains errors in Policy Explorer, then shows the first node (either a condition/action node or AND/OR/NOT node) that contains the error and use the tooltip to display what exactly the error is. The focus is then on that node.

Exemplary operations and associated error messages are provided in Table 4. Some operations fail when the error occurs; other operations succeed in UI but are detected and prompted in later.

TABLE 4

| Operation | Break Rule # | Error message | When and How to show the message, and What to do. |
|---|---|---|---|
| Drag and drop a vocabulary definition from the Policy Explorer to a folder node in the Conditions panel | Rule 3 | "The vocabulary definition <name> can not be used as a condition, it must be a Boolean type" <name> is replaced with the definition name. | When: Before the definition is added into the Conditions tree. How: Popup a message box. To do: When the user clicks "OK", the message box is gone. The operation fails. The focus is back to where it was. |
| Add more than one nodes (AND/OR/NOT and condition) under "Conditions" nodes | Rule 4 | "The Conditions node should not more than one child nodes. They must be in either AND, OR or NOT logical relationship". | When: After the node is added into the Conditions tree. Or the mouse moves over the node again later. The user tries to save the policy. How: Conditions node is marked as different color. The message is shown on the tooltip. To do: The user needs to |

TABLE 4-continued

| Operation | Break Rule # | Error message | When and How to show the message, and What to do. |
|---|---|---|---|
| | | | correct them; otherwise it will block the user from saving the policy. No focus change. |
| Add more than one nodes (AND/OR/NOT and condition) under "NOT" node Change AND/OR to NOT node | Rule 6 | "The NOT node should not more than one child nodes. They must be in either AND, OR or NOT logical relationship". | When: After the node is added into the NOT tree. Or the mouse moves over the node again later. The user tries to save the policy. How: NOT node is marked as different color. The message is shown on the tooltip. To do: The user needs to correct them; otherwise it will block the user from saving the policy. No focus change. |
| Delete "Conditions" node | Rule 1 | No error message. The "delete" menu item or toolbar item is disabled. And when the user presses the "DEL" key, it beeps. | N/A |
| Delete "Actions" node | Rule 11 | No error message. The "delete" menu item or toolbar item is disabled. And when the user presses the "DEL" key, it beeps. | N/A |
| Drag and drop a vocabulary definition from the Policy Explorer to a parameter placeholder in the Conditions or Actions panel | Rule 9, Rule 16 | "The vocabulary definition <name> can not be used for this parameter, which requires the <typename> type" <name> is replaced with the definition name. <typename> is replaced with the type of the parameter | When: Before the definition replaces the placeholder. How: Popup a message box. To do: When the user clicks "OK", the message box is gone. The operation fails. The focus is back to where it was. |
| Create a new AND/OR node; Add/Delete child nodes under AND/OR node; Change NOT node to AND/OR node. | Rule 5 | "The AND / OR must have at least two child nodes". | When: After the node is created, or a child node is added. Or the mouse moves over the node again later. The user tries to save the policy How: AND/OR node is marked as different color. The message is shown on the tooltip. To do: The user needs to correct them; otherwise it will block the user from saving the policy. No focus change. |
| A condition or action is created with parameter placeholders; Inline editing parameters | Rule 7 Rule 14 | "All the parameters must be fully specified." | When: The user tries to save the policy. How: The condition or action is selected. The message is shown on the tooltip. To do: The user needs to correct them; otherwise it will block the user from saving the policy. No focus change. |
| Inline Editing | Rule 8 Rule 15 | "The value format is wrong", Or "The value must be in the range | When: The user tries to confirm the entry of the value. How: The message is shown on the tooltip. To do: The user needs to correct them; otherwise it will block the user from entering the value. No focus change. |

TABLE 4-continued

| Operation | Break Rule # | Error message | When and How to show the message, and What to do. |
|---|---|---|---|
| No Ops | Rule 10<br>Rule 17 | "The left hand side parameter and right hand side parameter must be of compatible type". | (See also "Valid Entry and Type Validation")<br>When: The user tries to save the policy<br>How: The message is shown on the tooltip.<br>To do: The user needs to correct them; otherwise it will block the user from saving the policy. No focus change. |

The validation status can be stored with each node (see Node Properties section).

It is to be appreciated that both Conditions and Actions panel can be allowed to be empty. If a rule's condition is empty, it means always true. If a rule's action is empty, that means no actions will be executed if the rule is fired.

Internationalization in Rule Editor

For internationalization, conditions, actions and its parameter display names can be localized to different language by localizing or changing vocabulary definitions. However, AND, OR, NOT can be treated as mathematical or logical symbols rather than words in natural language, thus they can be localized accordingly in different language(s).

While FIG. 1 is a block diagram illustrating components for the system 100, it is to be appreciated that the system 100, the input component 110, the rule composer 120 and/or the display component 130 can be implemented as one or more computer components, as that term is defined herein. Thus, it is to be appreciated that computer executable components operable to implement the system 100, the input component 110, the rule composer 120 and/or the display component 130 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 15:
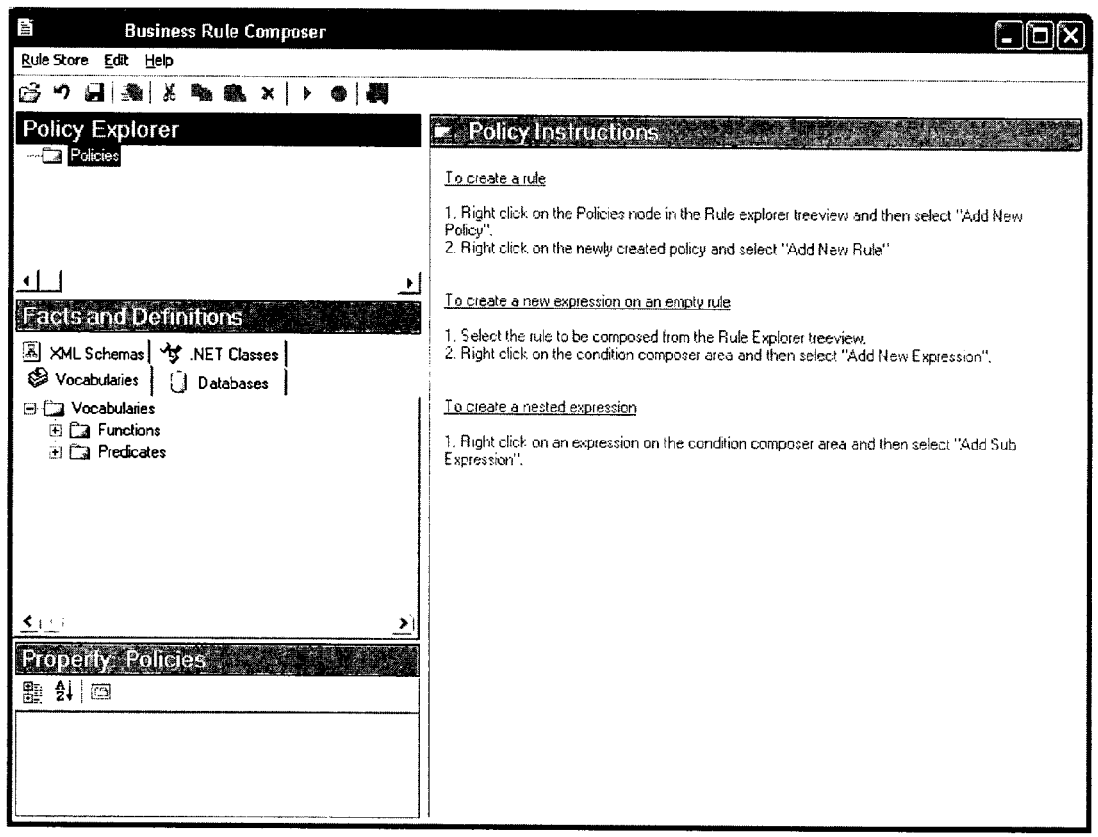
FIG. 15 is an exemplary user interface in accordance with an aspect of the present invention.

Turning to FIGS. 15-46, user interfaces associated with an exemplary loan processing policy in accordance with aspects of the present invention are illustrated. Referring to FIG. 15, an exemplary user interface 1500 illustrates an initial policy and vocabulary composer interface.

Figure 16:
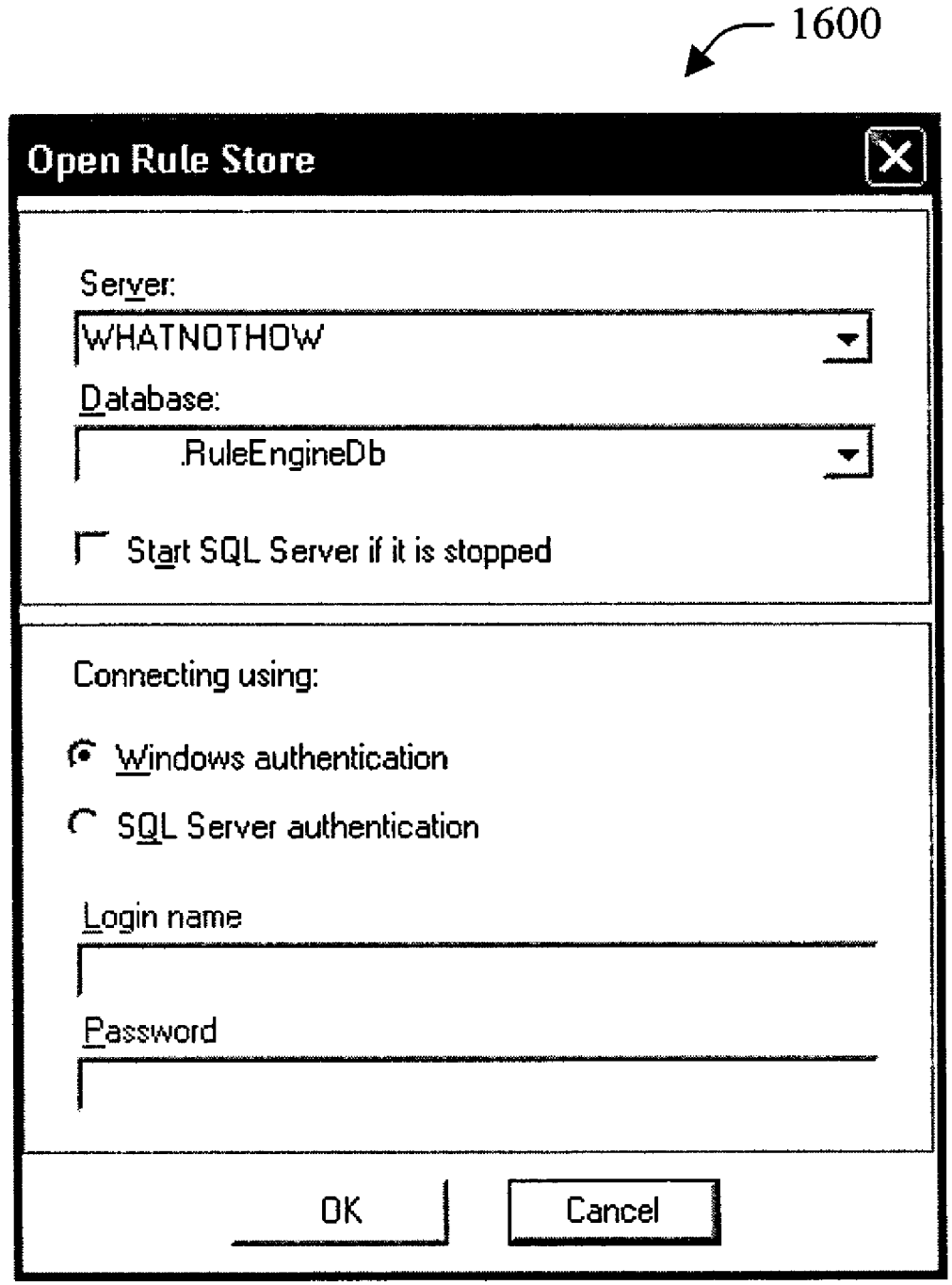
FIG. 16 is an exemplary user interface in accordance with an aspect of the present invention.

Next, FIG. 16 illustrates an exemplary user interface 1600 that facilitates connection to a rule store. The rule store stores policies and vocabularies. In one example, if this is the first time the policy and vocabulary composer has been launched, the open rule store dialog box show up automatically. In another example, the system (e.g., system 100) will try connecting to the last success rule store accessed. The user interface 1600 can further facilitate server authentication (e.g., requiring a login name and password).

Figure 17:
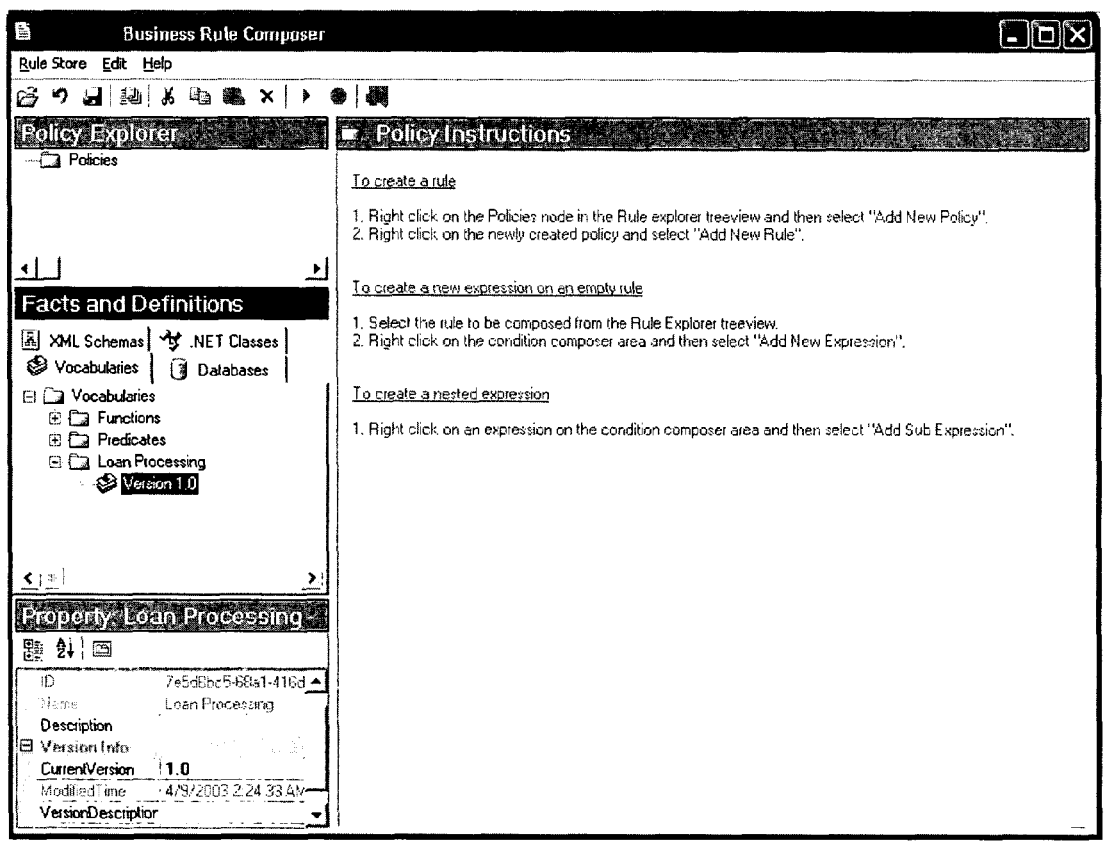
FIG. 17 is an exemplary user interface in accordance with an aspect of the present invention.

FIG. 17 illustrates an exemplary user interface 1700 for creating a new vocabulary, in this example, "loan processing version 1.0". To create the new vocabulary, a user:
(1) Clicks a Vocabularies tab on Facts and Definitions window;
(2) Right clicks a Vocabularies root node, selects "Add New Vocabulary". A "Vocabulary1" node is created as well as "Version 1.0 (not saved)" under it.
(3) Clicks "Vocabulary1", on Properties window, and enters "Loan Processing" as the new name for "Vocabulary1".
(4) Right clicks "Loan Processing→Version 1.0 (not saved)", and selects Save.

In order to add a "Case.xsd" schema into XML schemas view, a user:
(1) On the Facts and Definitions window, clicks XML Schemas tab and switch to the schema view.
(2) Right clicks a Schemas root node, and selects Browse
(3) On a Schema Files dialog box, selects Loans Processing using Business Rules\LoansProcessor\case.xsd, and clicks Open "case.xsd" is added into the schema view.

Figure 18:
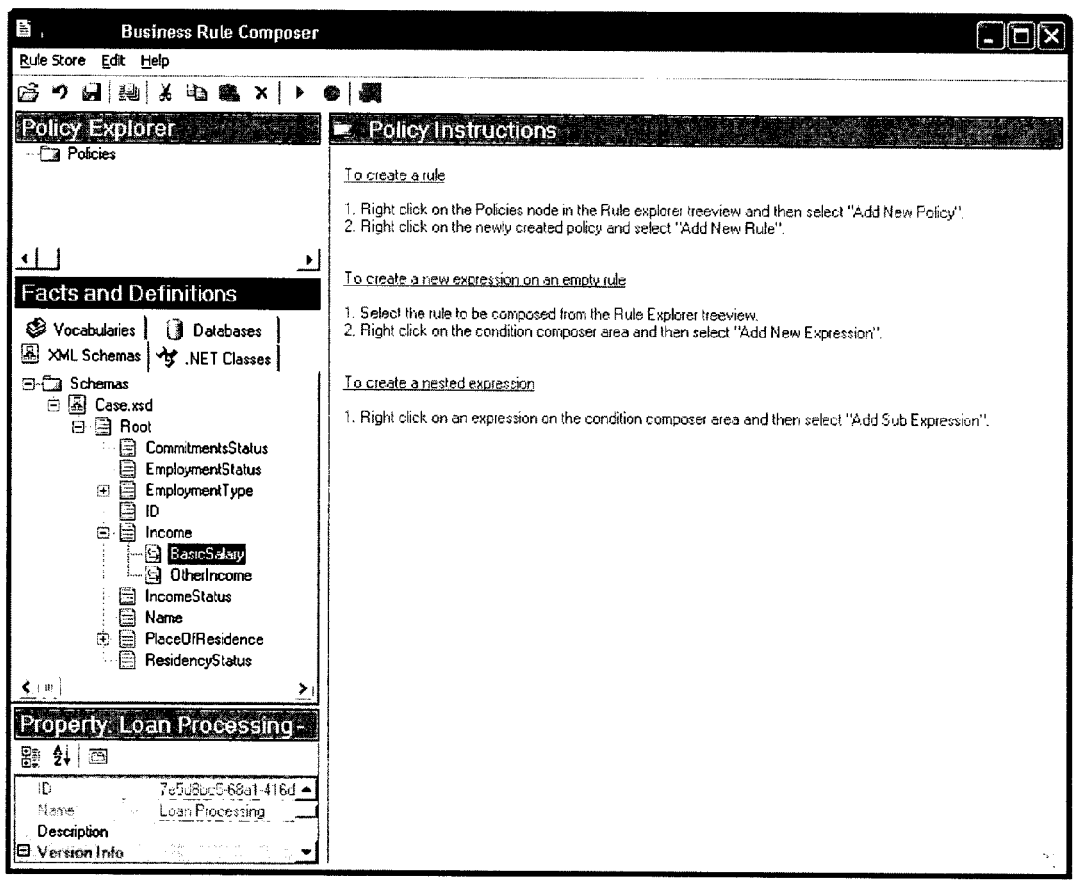
FIG. 18 is a screen shot of an exemplary vocabularies view in accordance with an aspect of the present invention.
Figure 19:
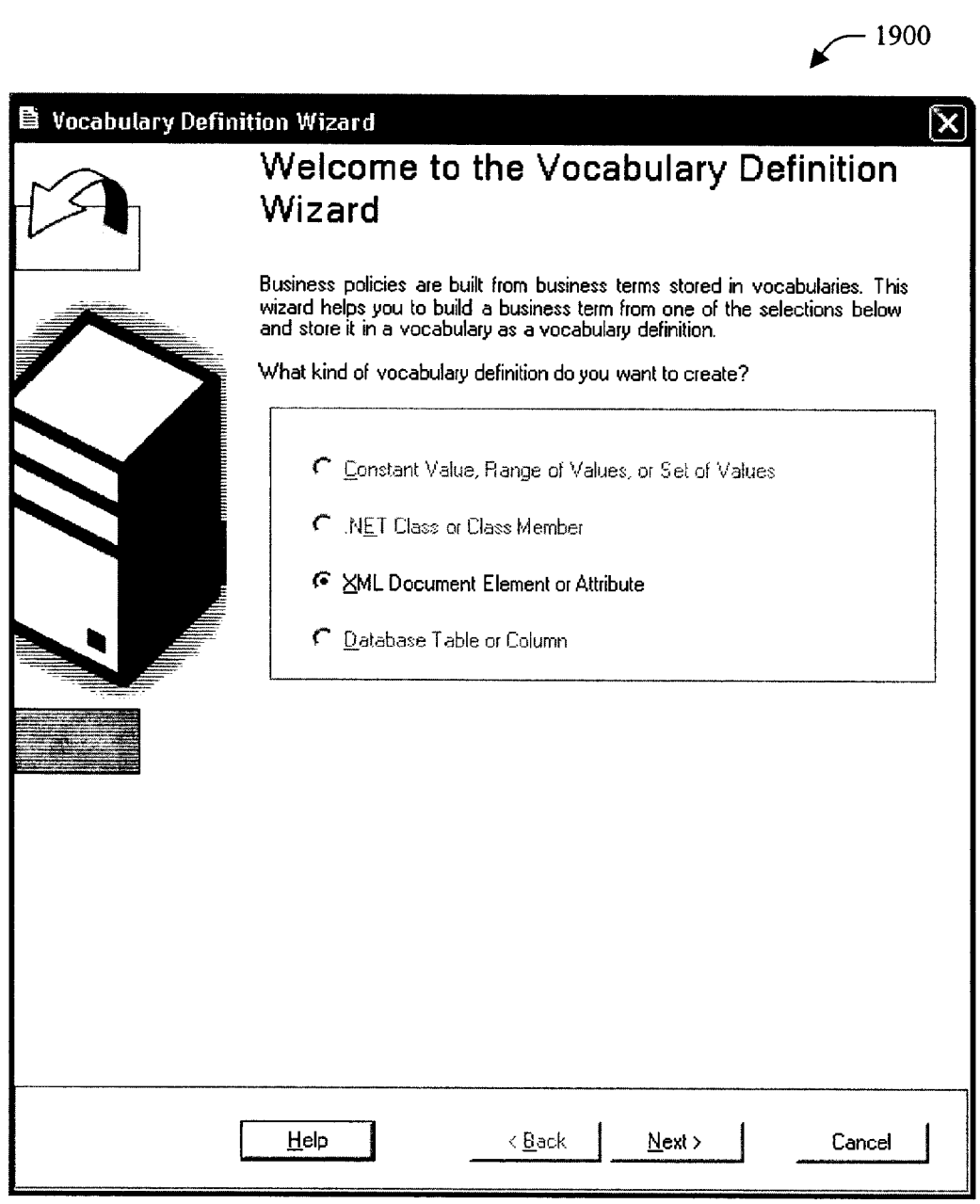
FIG. 19 is a screen shot of an exemplary vocabulary definition wizard in accordance with an aspect of the present invention.

The next exemplary action is to create a new definition Basic salary from Case.xsd schema under Loan Processing version 1.0 vocabulary. It will be used as a term in polices (e.g., a return a value). In order to create the new definition, a user:
(1) On the Facts and Definitions window and in the XML Schemas view.
(2) Navigates in the Case.xsd schema tree to Root→Income→BasicSalary.
(3) Clicks and drags BasicSalary over Vocabularies tab (but doesn't drop yet). The view is switched to Vocabularies view as illustrated in FIG. 18.
(4) Drops over "Loan Processing-> Version 1.0" and the Vocabulary Definition Wizard is launched as illustrated in FIG. 19.

In accordance with an aspect of the present invention, since rule composer (e.g., rule composer 120) recognizes the new definition is coming from XML schema, the XML Document Element or Attribute option is pre-selected as illustrated in user interface 1900.

Figure 20:
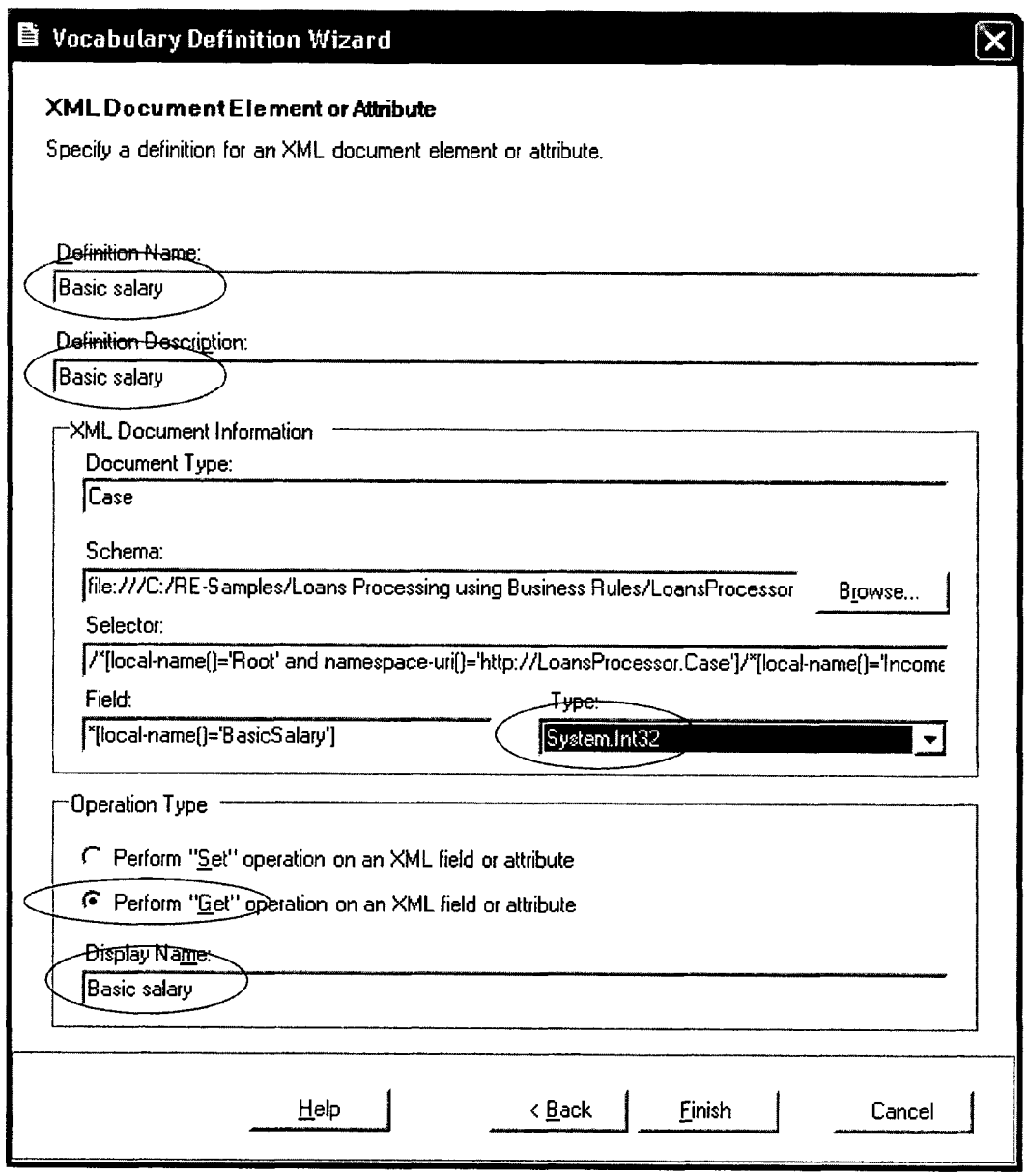
FIG. 20 is an exemplary user interface in accordance with an aspect of the present invention.
Figure 21:
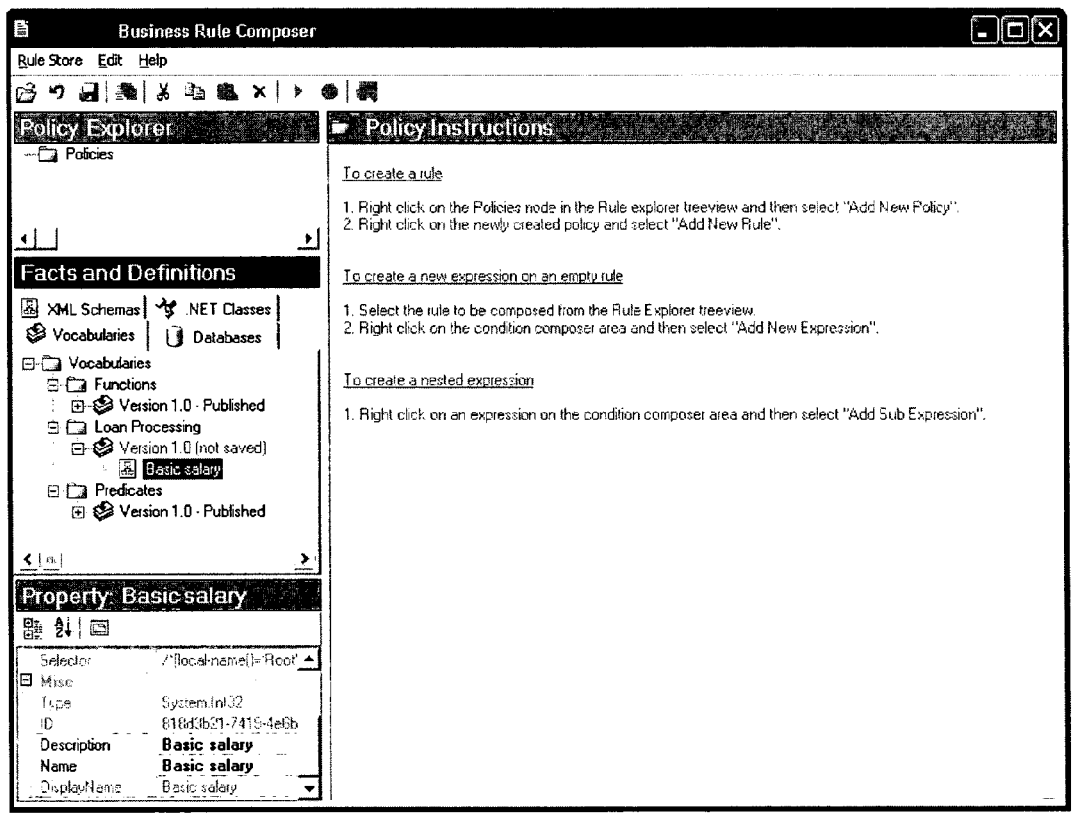
FIG. 21 is an exemplary user interface in accordance with an aspect of the present invention.
Figure 22:
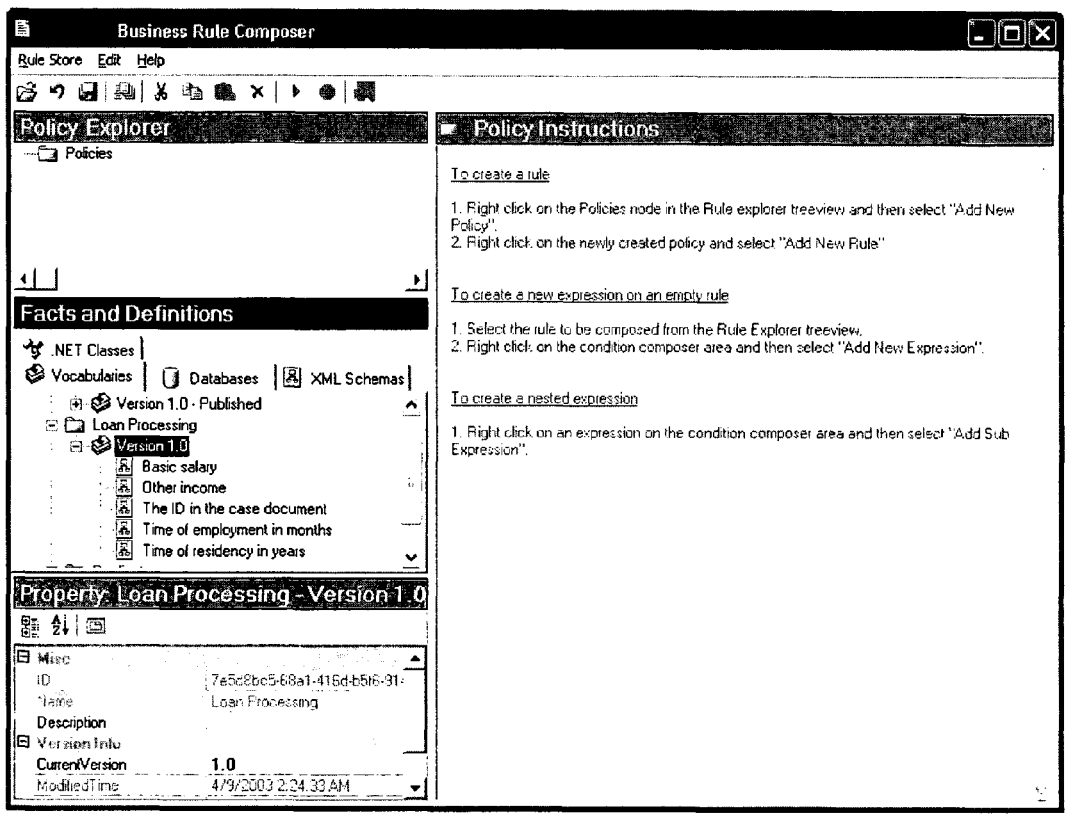
FIG. 22 is an exemplary user interface in accordance with an aspect of the present invention.

The user can select "Next", and enter the values as shown in FIG. 20 which illustrates user interface 2000. In this example, because "Basic salary" is used as a term, the user should select "Get operation type". When the user selects "Finish", the "Basic salary" definition is created under Loan Processing Version 1.0 vocabulary as illustrated in FIG. 21. Similarly, definitions can be created for "Other income", "The ID in the case document", "time of employment in months" and "time of residency in years" as illustrated in FIG. 22.

A new definition (e.g., from case.xsd) under "loan processing version 1.0" can be created with the "set" operation type:
(1) On "Facts and Definitions" window and XML Schemas view.

(2) Navigate in the Case.xsd schema tree to Root→IncomeStatus.

Figure 23:
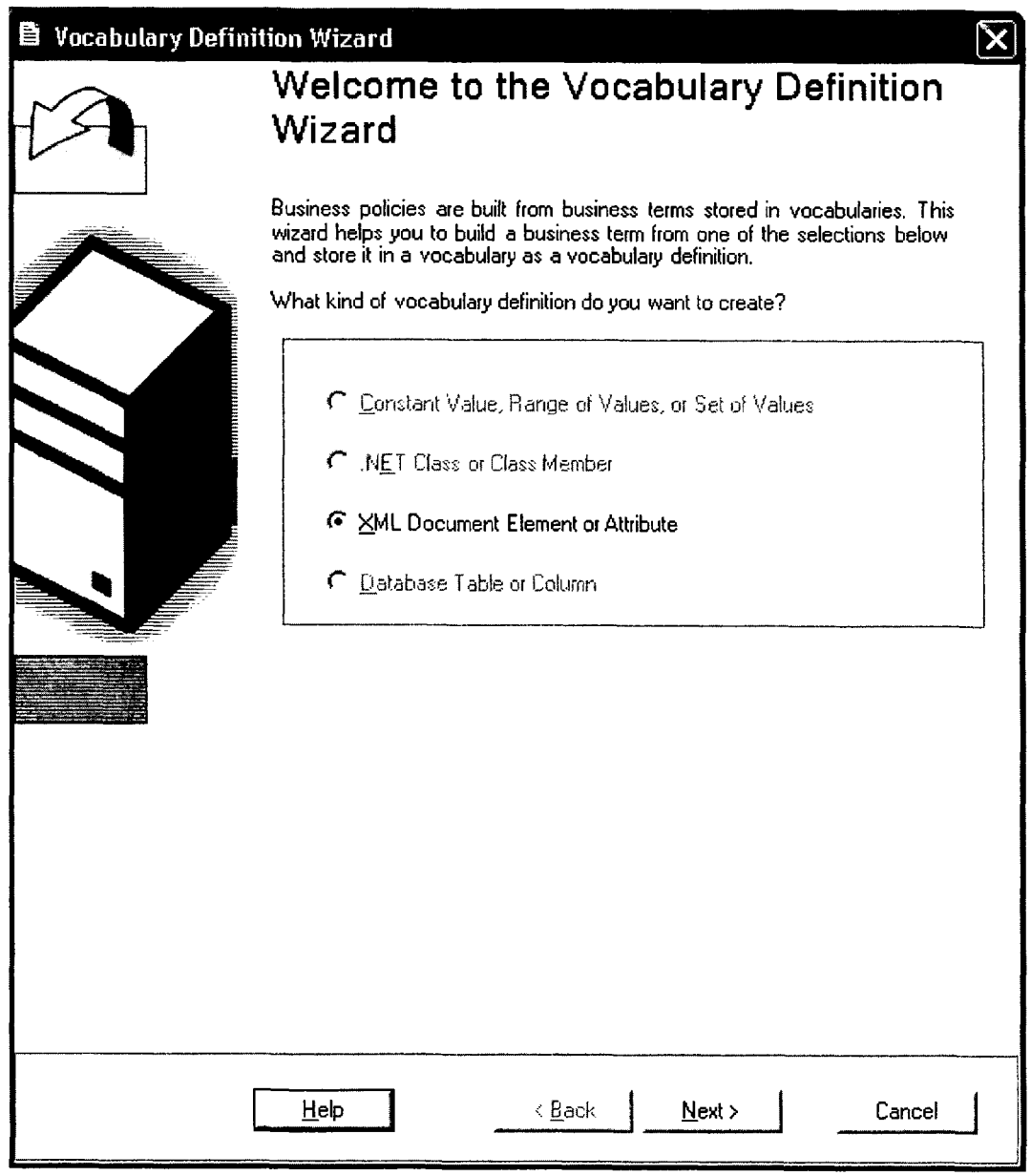
FIG. 23 is an exemplary vocabulary definition wizard user interface in accordance with an aspect of the present invention.

(3) Drag and drop under Loan Processing Version 1.0 vocabulary in Vocabularies view Thereafter, as illustrated in FIG. 23, a Vocabulary Definition Wizard is launched. In one example, since rule composer recognizes the new definition is coming from XML schema, the XML Document Element or Attribute option is pre-selected.

Figure 24:
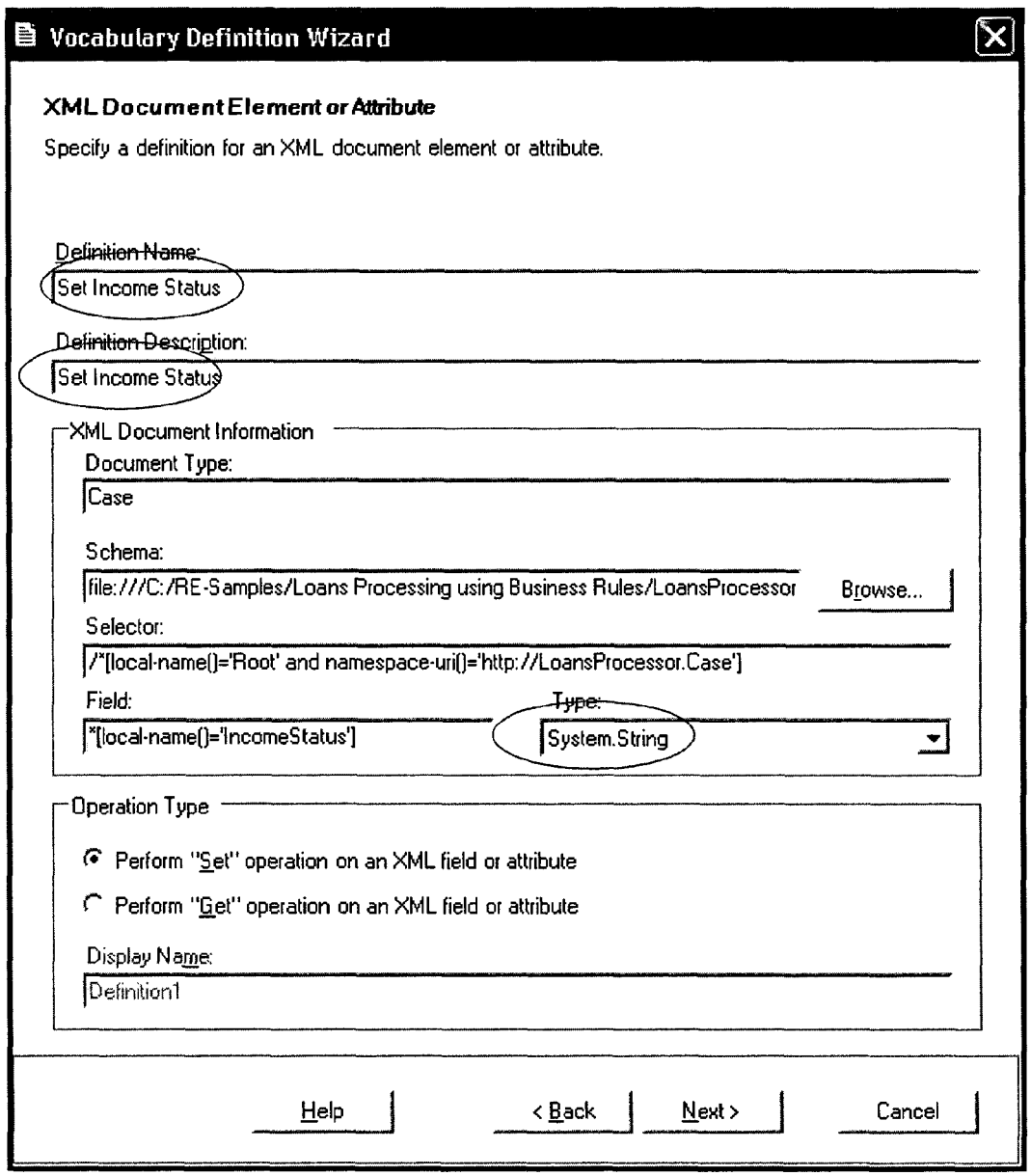
FIG. 24 is an exemplary user interface in accordance with an aspect of the present invention.

The user clicks "Next" and enters the value(s) as shown in FIG. 24. In this example, because "Income status" is used as the target of a set function, the user should select "Set operation type".

Figure 25:
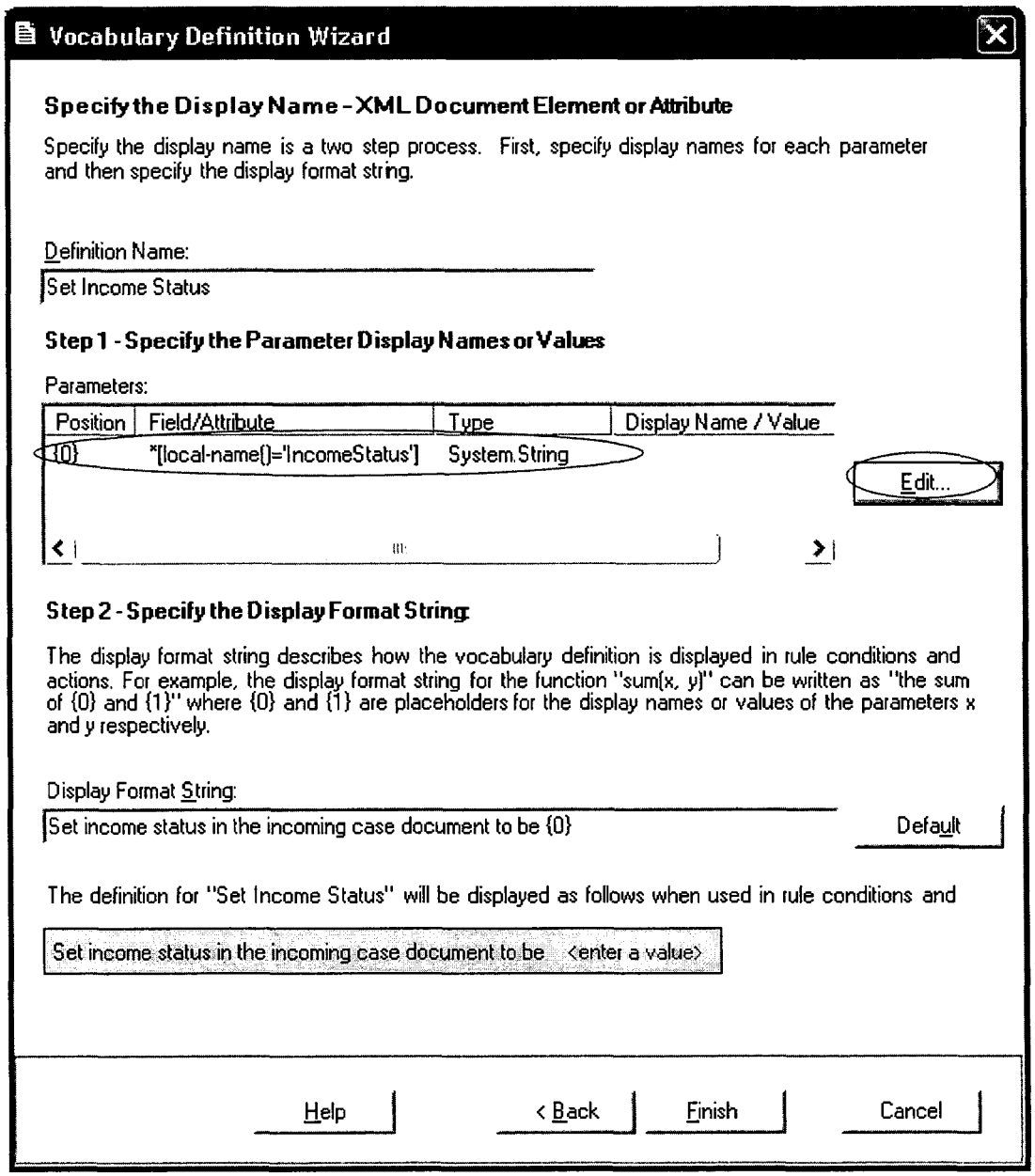
FIG. 25 is an exemplary user interface in accordance with an aspect of the present invention.
Figure 26:
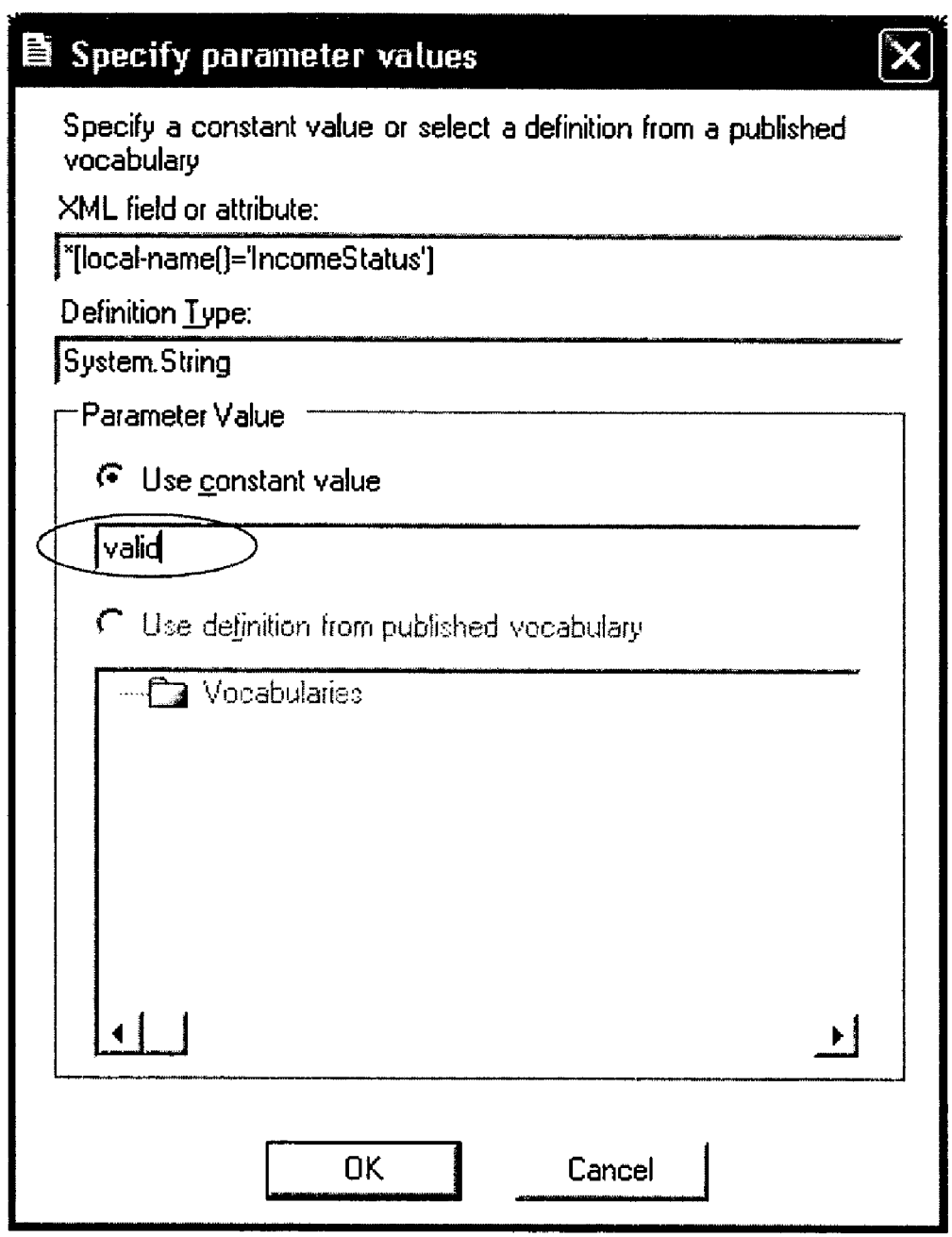
FIG. 26 is an exemplary user interface in accordance with an aspect of the present invention.
Figure 27:
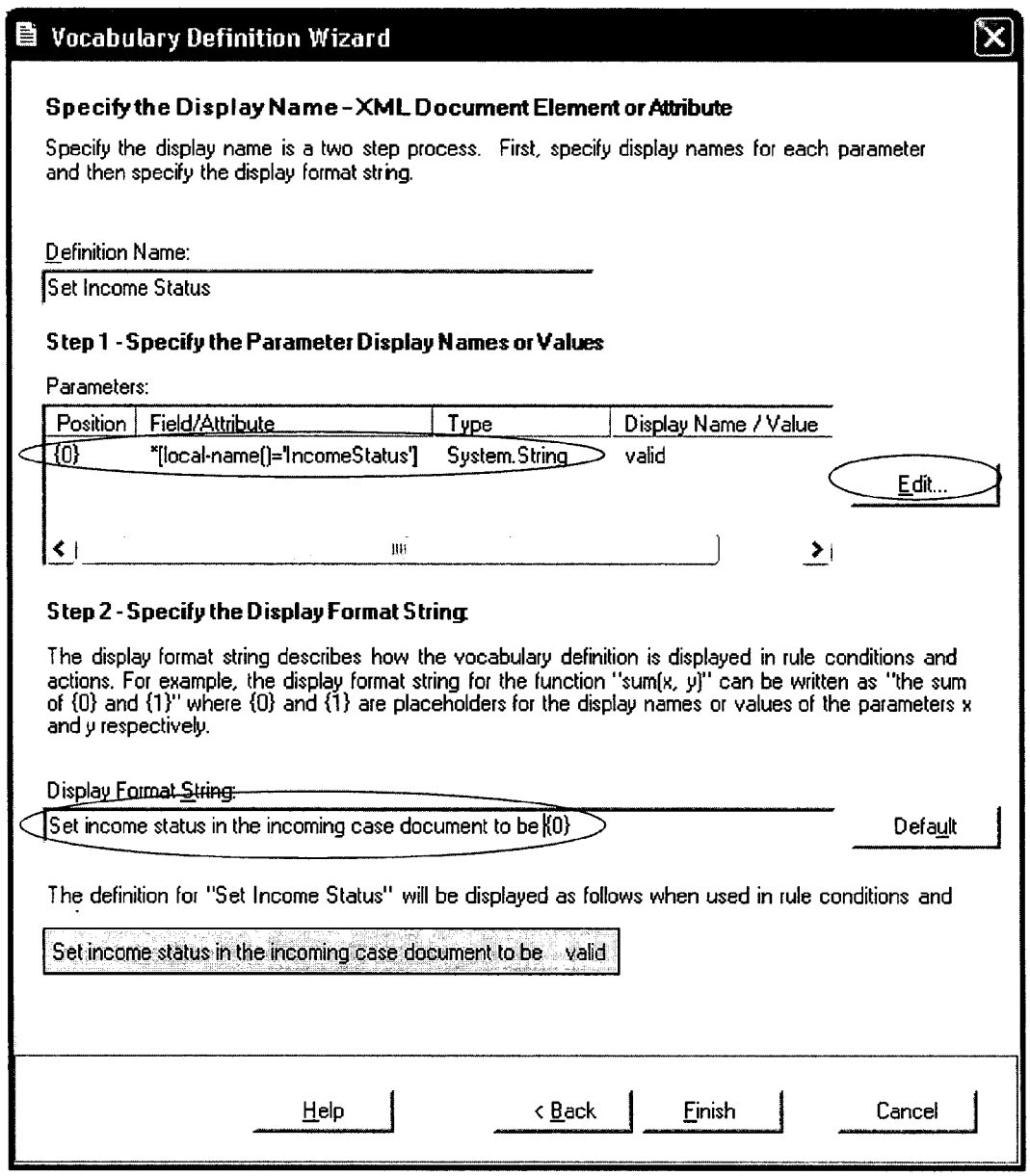
FIG. 27 is an exemplary vocabulary definition wizard user interface in accordance with an aspect of the present invention.
Figure 28:
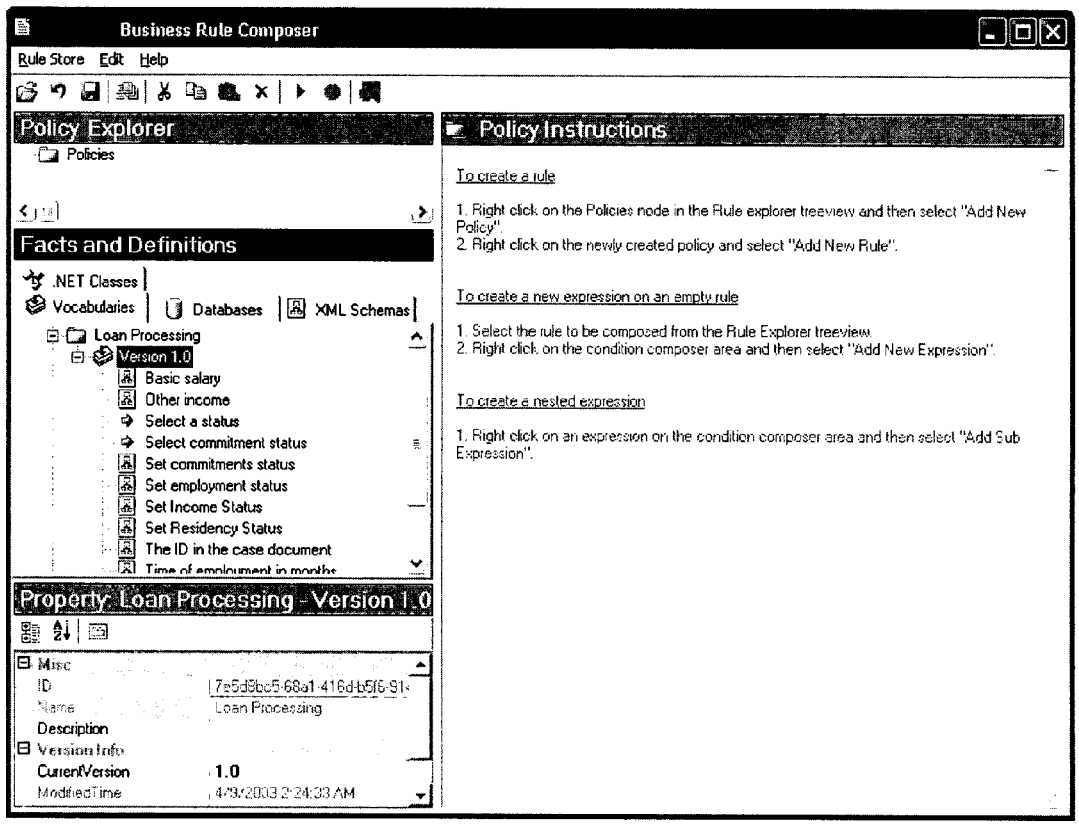
FIG. 28 is an exemplary user interface in accordance with an aspect of the present invention.

The user selects "next" and as shown in FIG. 25, selects the parameter in the Parameters list, and, selects the "edit" button. The user enters value(s) as shown in FIG. 26. The user is returned to the vocabulary definition wizard as illustrated in FIG. 27, and, selects "Finish". Similarly, definitions can be created for:

"Set commitment status in the incoming case document to be {0}",

"Set employment status in the incoming case document to be {0}", and,

"Set residency status in the incoming case document to be {0}", as illustrated in FIG. 28.

Figure 29:
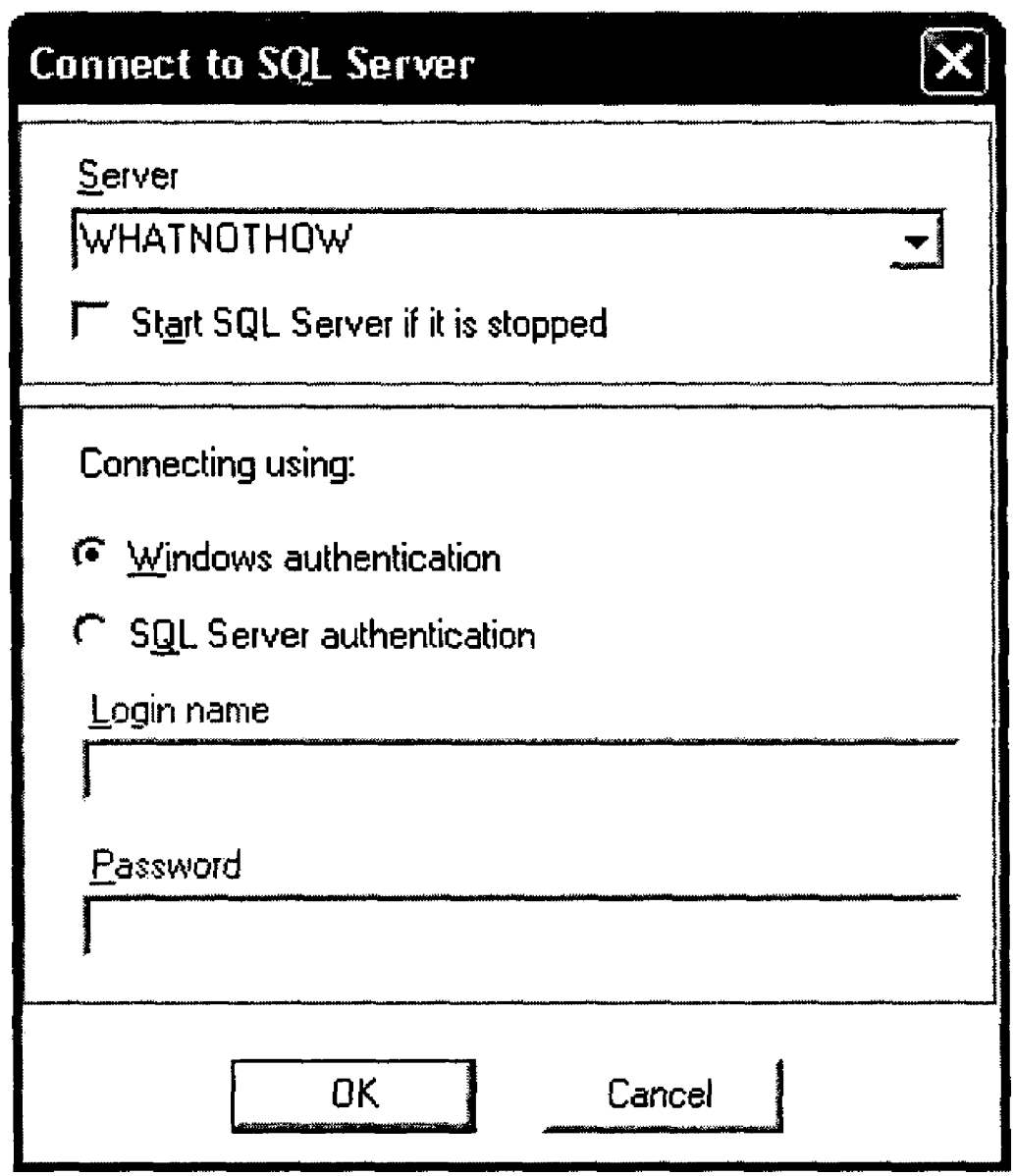
FIG. 29 is an exemplary user interface in accordance with an aspect of the present invention.

Turning to FIG. 29, a "CustIfo" table can be added from a database on a server into the Database view by user:
(1) On the "Facts and Definitions" window, clicking "Database" and switch to the database view.
(2) Right click "Servers" root node, select "Browse"
(3) Another dialog box Connect to package particular is opened. On Schema Files dialog box, the user selects Loans Processing using Business Rules\LoansProcessor\case.xsd, and clicks Open "WHATNOTHOW" is added into the Database view in this example.

Figure 30:
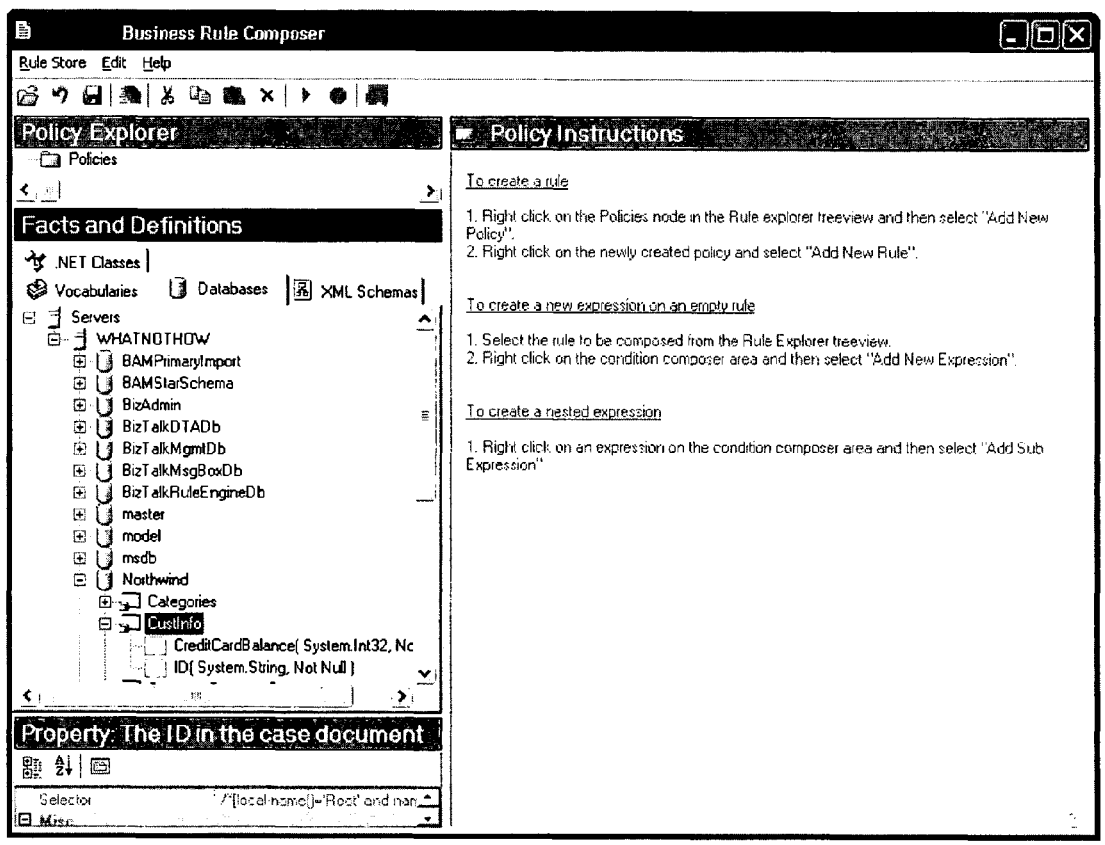
FIG. 30 is an exemplary user interface in accordance with an aspect of the present invention.
Figure 31:
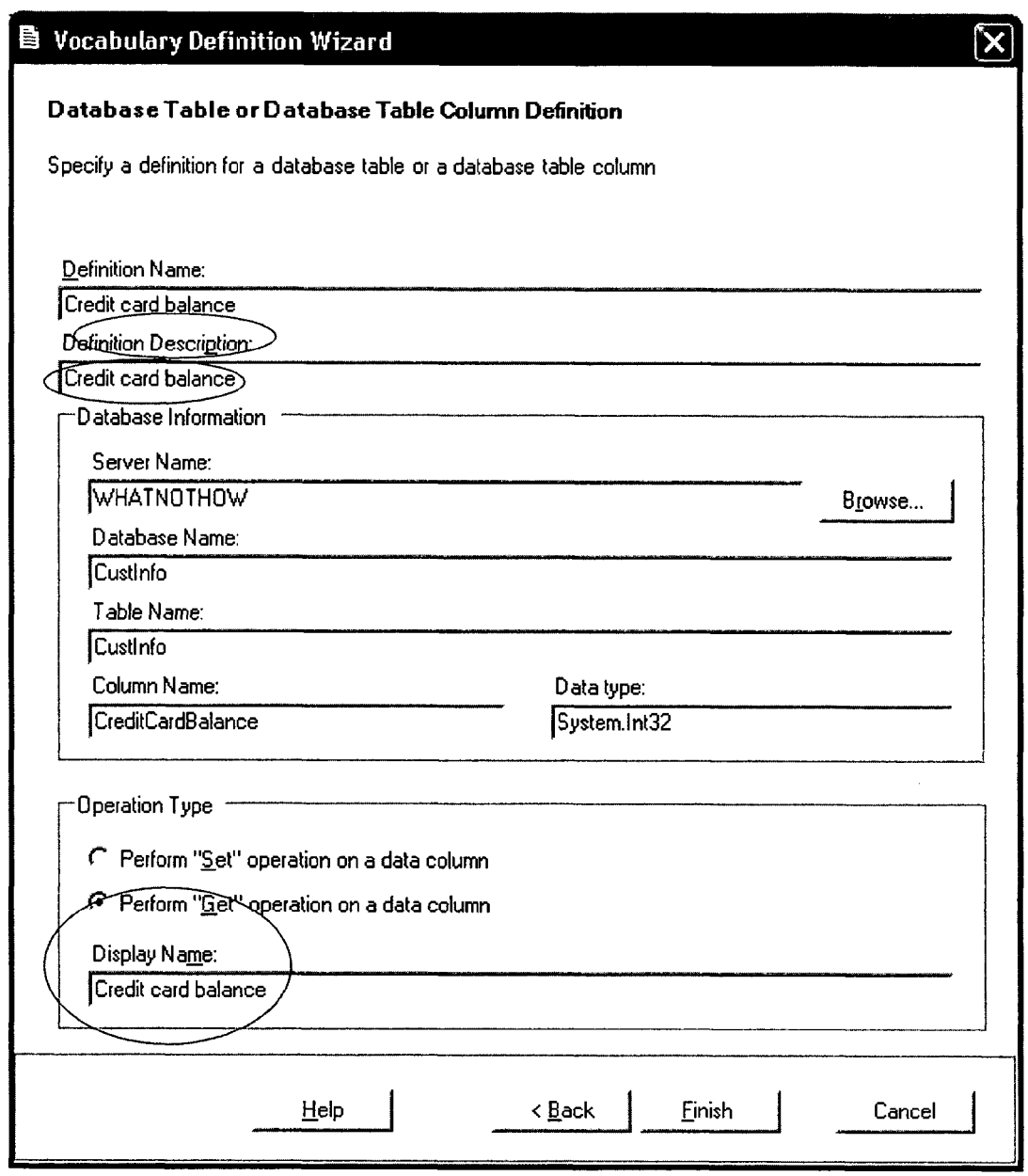
FIG. 31 is an exemplary user interface in accordance with an aspect of the present invention.

Next, as illustrated in FIG. 30, a new definition from the CustInfo table under Loan Processing version 1.0 vocabulary is create with the Get operation type (used as a term) by:
(1) On "Facts and Definitions" window and "Databases" view.
(2) Select "NorthWind\CustInfo" table and its column "CreditCardBalance"
(3) Drag and drop under "Loan Processing Version 1.0" vocabulary in "Vocabularies" view The "Vocabulary Definition Wizard" is launched as illustrated in FIG. 31. Similar steps can be taken to define "The ID column in customer table", DB table column, System.String type, Get operation type. Thus, the vocabulary definitions defined under Loan Processing Version 1.0 vocabulary have been created. The "Loan Processing/Version 1.0" can be saved by selecting "Save".

Figure 32:
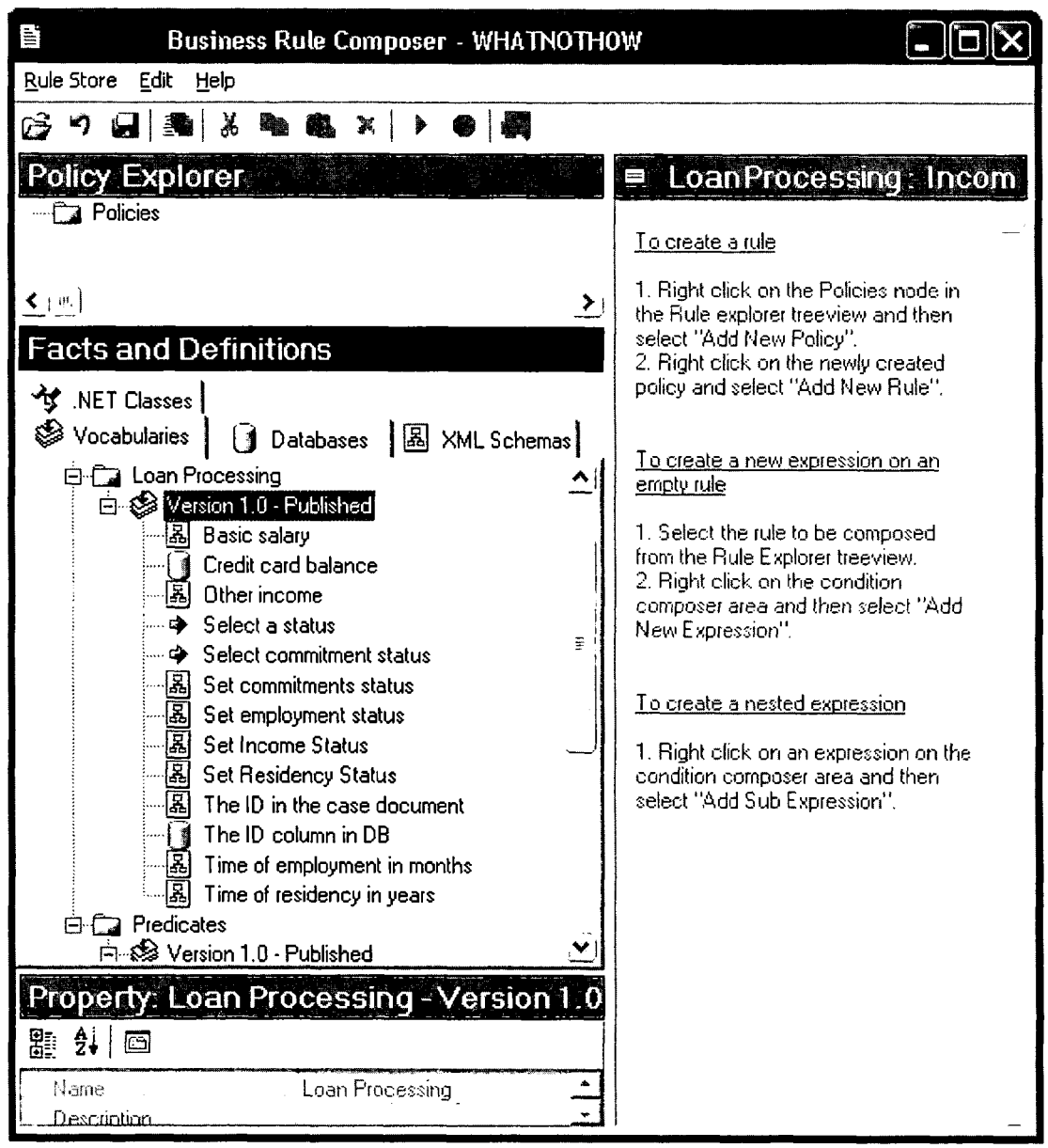
FIG. 32 is an exemplary user interface in accordance with an aspect of the present invention.

Before building the policy based on these vocabulary definitions, they are published. Referring to FIG. 32, publication can be accomplished by:
(1) On "Facts and Definitions" window, click "Vocabularies" tab
(2) Right clicking "Loan Processing/Version 1.0", select "Publish".

Figure 33:
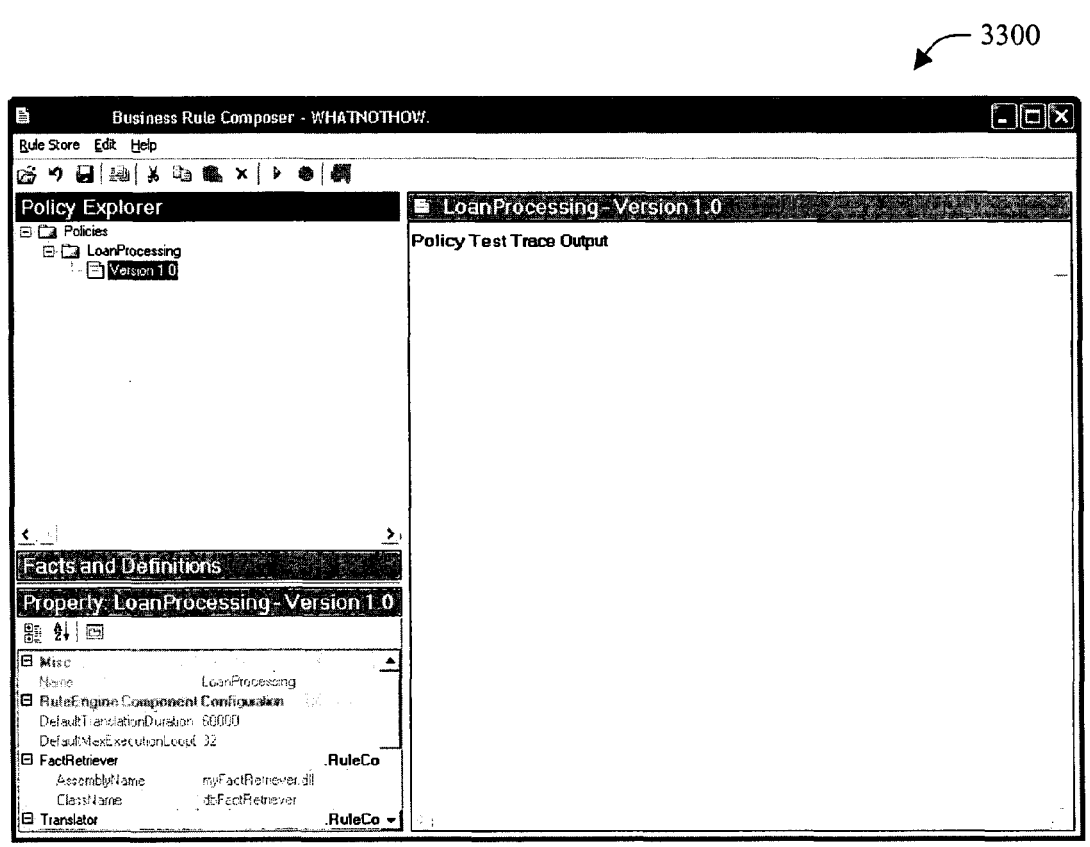
FIG. 33 is an exemplary user interface in accordance with an aspect of the present invention.

Turning to FIG. 33, in order to create a new policy "Loan Processing version 1.0", a user:
(1) On "Policy Explorer" window, right click "Policies", select Add New Policy", and, a "Policy1 version 1.0" is created under "Policies".
(2) Click "Policy1", go to "Properties" window, enter "LoanProcessing" for "Name" property,
(3) Right click "LoanProcessing→Version 1.0", and, select "Save".

Figure 34:
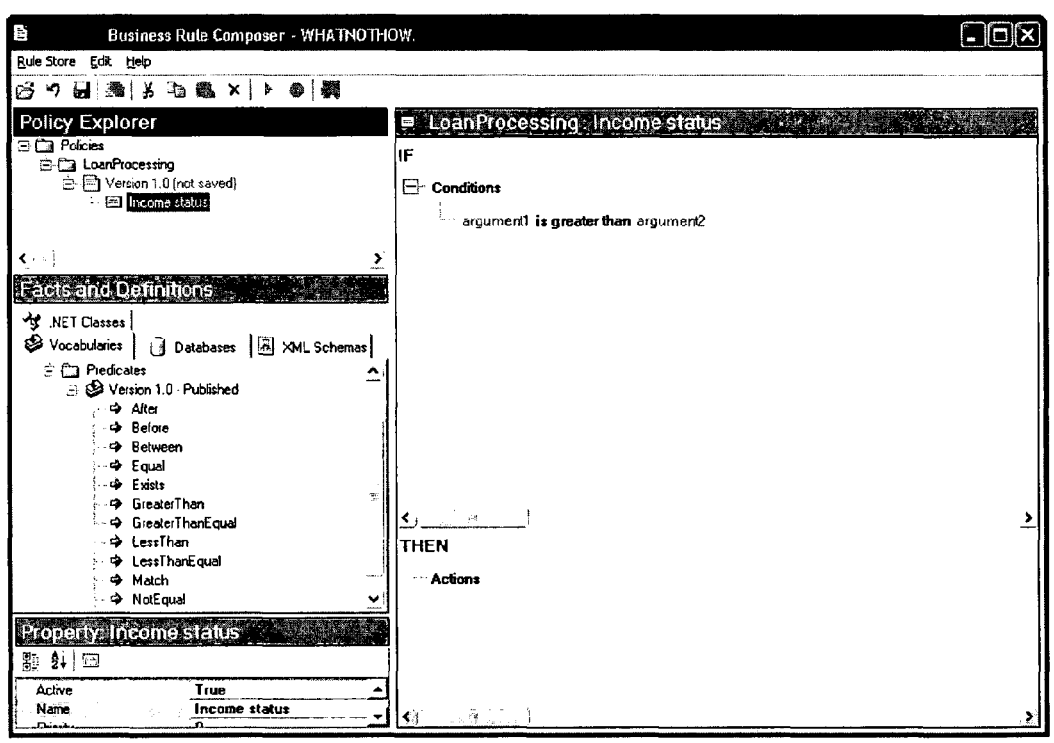
FIG. 34 is an exemplary user interface in accordance with an aspect of the present invention.

FIG. 34 illustrates creation a new rule (e.g., Income status) and composition of the condition and action. In this example, the business rule to be implemented is:

Income status rule:
If
    Basic salary is greater than 0 and
    Other income is greater than 0
Then
    Set income status in the coming case document to be valid To create this rule, a user:
(1) Right clicks "LoanProcessing→Version 1.0", selects "Add New Rule". A new rule (e.g., "Rule1") is created under version 1.0.
(2) Changes the name of this new rule from "Rule1" to "Income Status" in "Properties" window.
(3) Clicks "Income Status" rule, the right hand side has IF and THEN windows.
(4) Goes to "Facts and Definitions" window and "Vocabularies" view.
(5) Goes "to Vocabularies→Predicates→Version 1.0—Published", and, selects "GreaterThan".
(6) Drags and drops the "GreaterThan" predicate over the "Conditions" node in the IF window.

Figure 35:
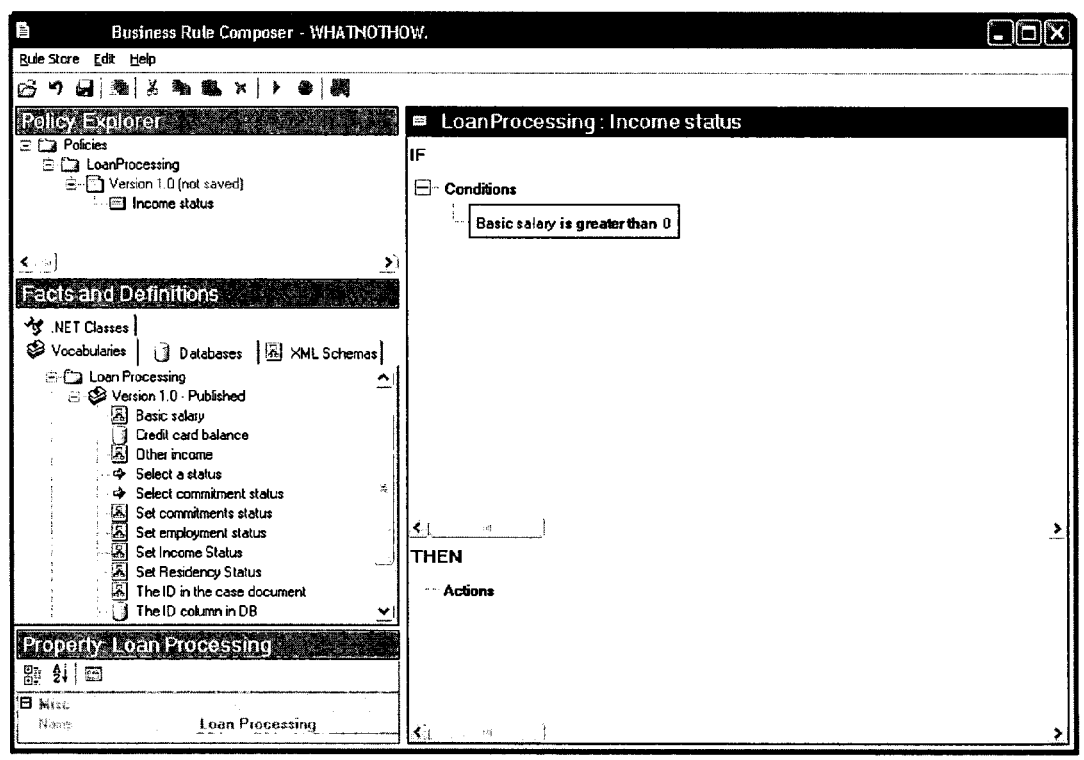
FIG. 35 is an exemplary user interface in accordance with an aspect of the present invention.

Referring to FIG. 35, the user:
(1) Goes to "Vocabularies→Loan Processing→Version 1.0—Published", and, selects "Basic Salary"
(2) Drags and drops "Basic Salary" over argument1
(3) Click argument2 and types in 0.

Figure 36:
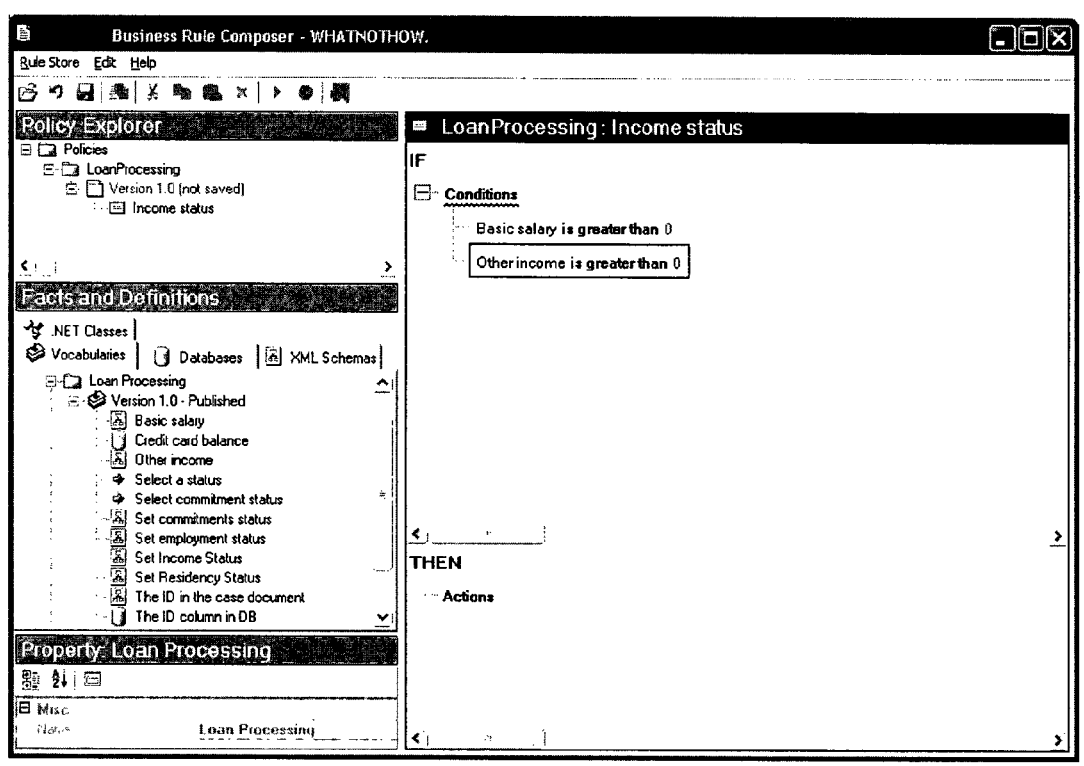
FIG. 36 is an exemplary user interface in accordance with an aspect of the present invention.

Turning to FIG. 36, the user further:
(1) Drags and drops another "GreaterThan" predicate over "Conditions" node. The second predicate is appended to the conditions tree. The "Conditions" node can be accentuated (e.g., red underline)
(2) Drags and drops "Other income" from "Loan Processing→Version 1.0—Published" vocabulary over argument1 of the second predicate.
(3) Selects argument2 of the second predicate and types in 0.

Figure 37:
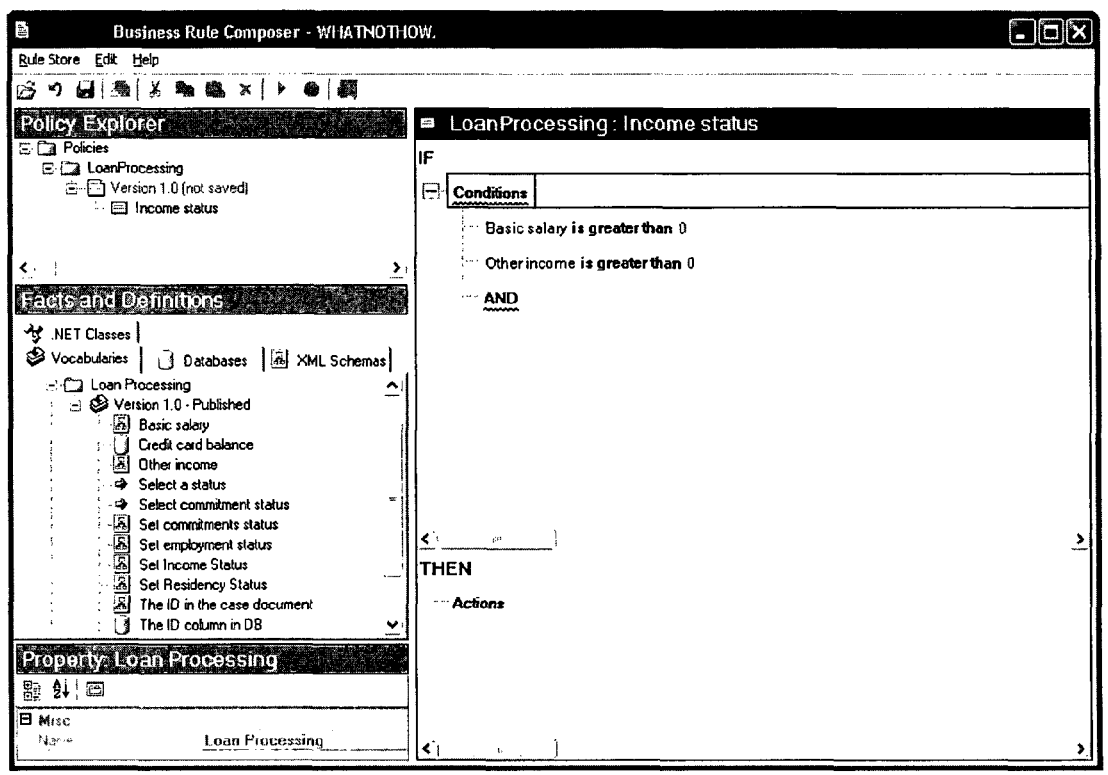
FIG. 37 is an exemplary user interface in accordance with an aspect of the present invention.

As illustrated in FIG. 37, the user:
(1) Right clicks the "Conditions" node, and, selects "Add logical AND"
(2) An "AND" node is created under "Conditions" node.

Figure 38:
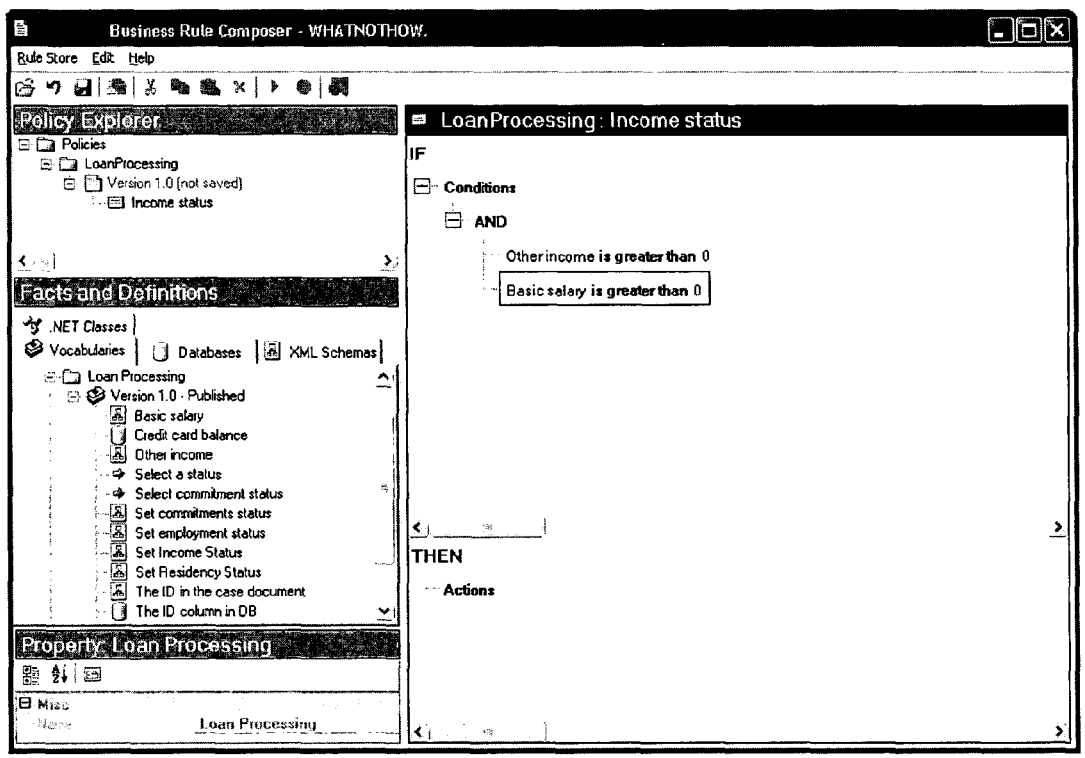
FIG. 38 is an exemplary user interface in accordance with an aspect of the present invention.
Figure 39:
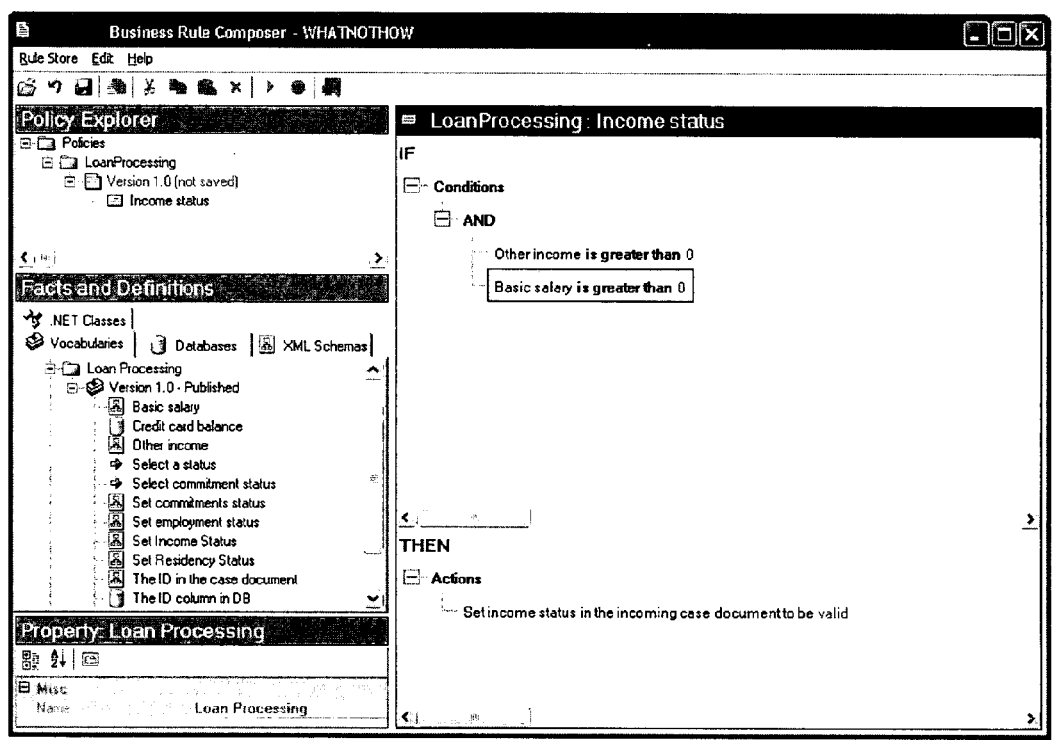
FIG. 39 is an exemplary user interface in accordance with an aspect of the present invention.

Turning to FIG. 38, the user drags and drops the first two predicates over "AND" node. As further illustrated in FIG. 39, the user drags and drops "Set Income Status from Loan Processing→Version 1.0—Published" vocabulary over "Actions" node in the THEN window.

Figure 40:
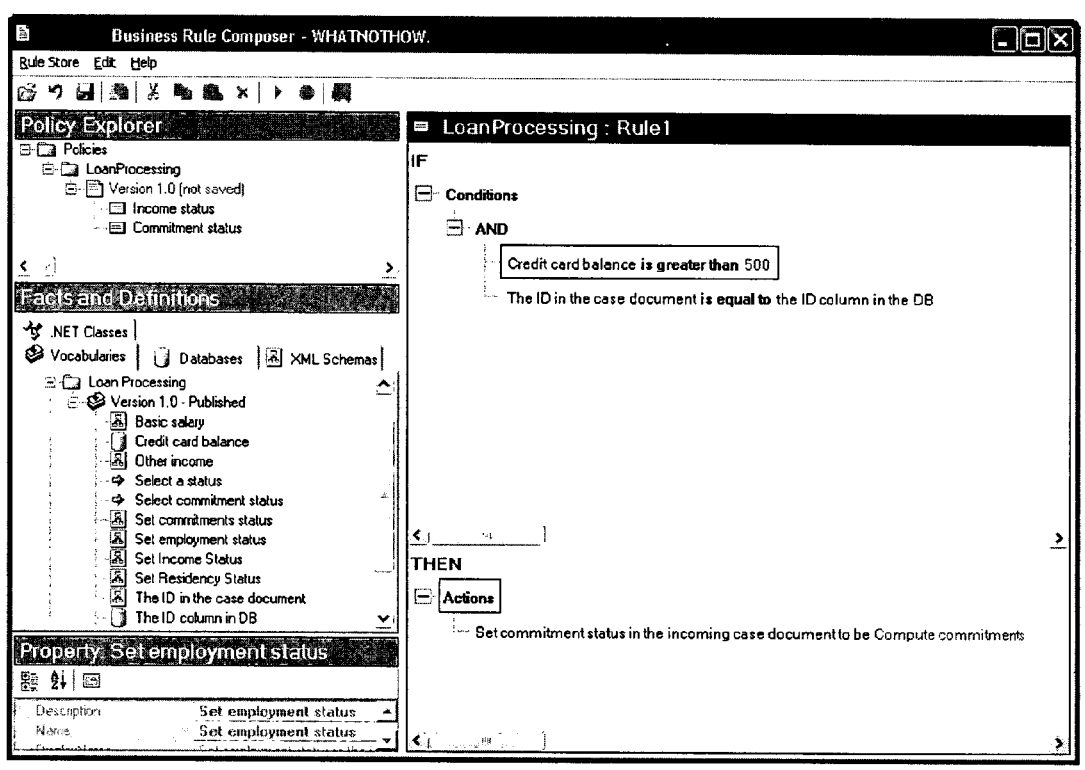
FIG. 40 is an exemplary user interface in accordance with an aspect of the present invention.
Figure 41:
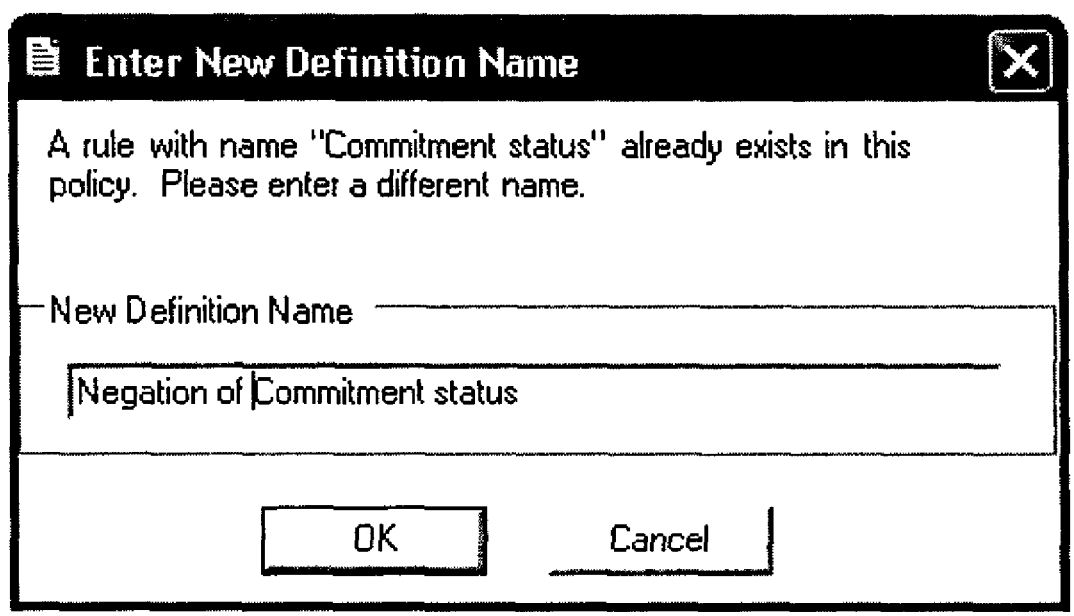
FIG. 41 is an exemplary user interface in accordance with an aspect of the present invention.

As illustrated in FIG. 40, the user can create another rule (e.g., Commitment status) similarly. The business rule to be implemented is:

Commitments status rule:
If
    The ID in the case document is equal to the ID column in DB
    and
    Credit card balance is greater than 500
Then
    Set commitments status in the coming case document to be compute commitments Next, turning to FIG. 41, in order to create the negation of an existing rule (e.g., Commitment status), a user:
(1) Right clicks "Commitment status" rule, and, selects "Copy"
(2) Right clicks "LoanProcessing→Version 1.0" policy, and, selects "Paste New Rule"

At which time, the dialog box 4100 is displayed. Thereafter, the user:
(1) Changes the rule name to "Negation of Commitment status", and, clicks "OK".
(2) Selects "Negation of Commitment status" rule in Policy Explorer to create a copy of "Commitment status" rule.
(3) Right clicks "Conditions" node, and, selects "Add logical NOT"
(4) A "NOT" node is created under "Conditions" node
(5) Drags and drops the existing "AND" node under "NOT" node.
(6) Clicks "Compute commitments" argument in Actions part, and changes it to "Ignore commitments"

Figure 42:
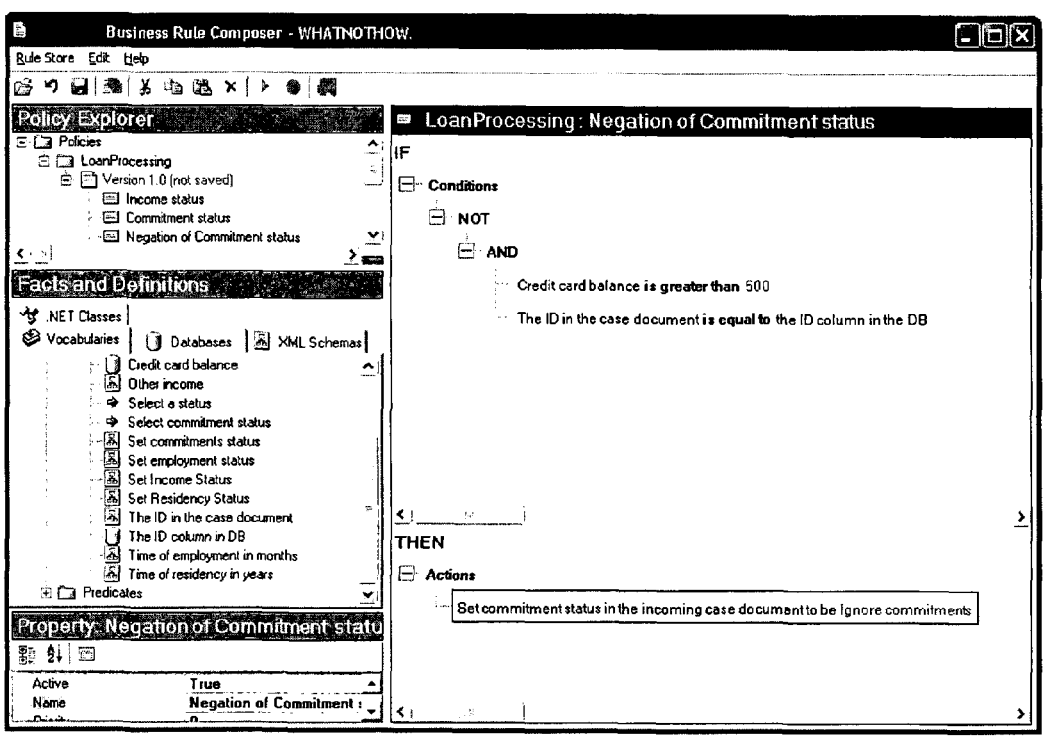
FIG. 42 is an exemplary user interface in accordance with an aspect of the present invention.

FIG. 42 illustrates the result of this process.

Figure 43:
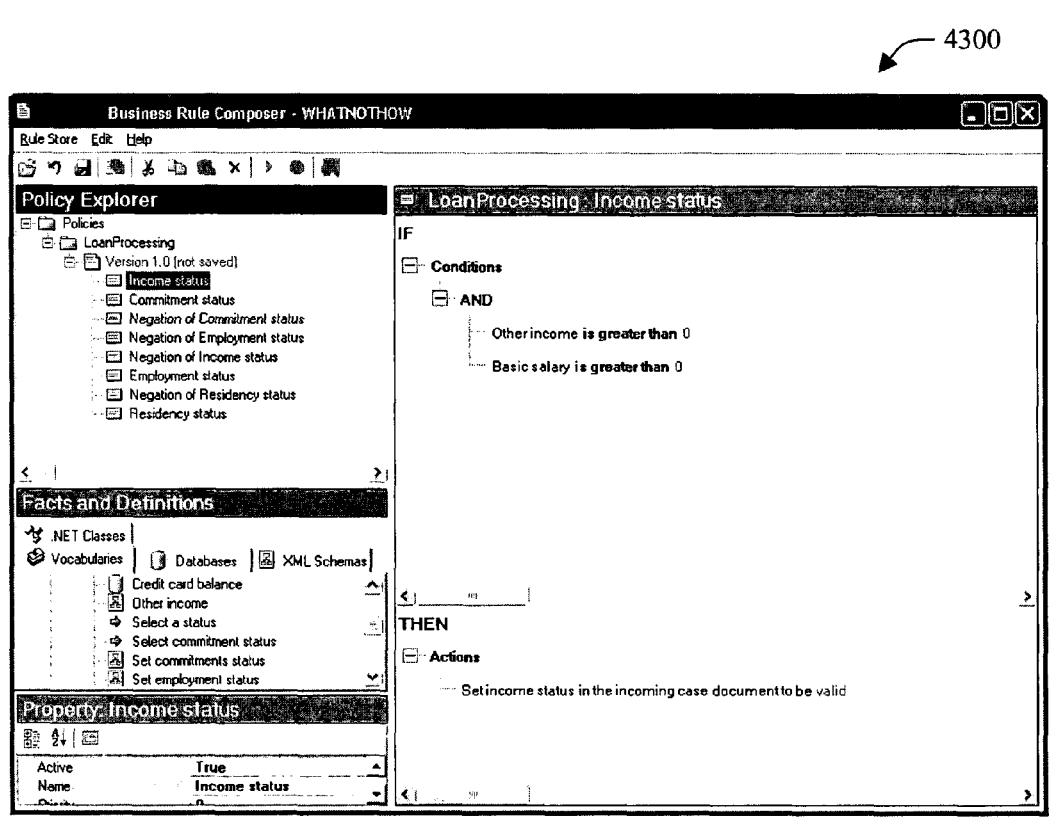
FIG. 43 is an exemplary user interface in accordance with an aspect of the present invention.
Figure 44:
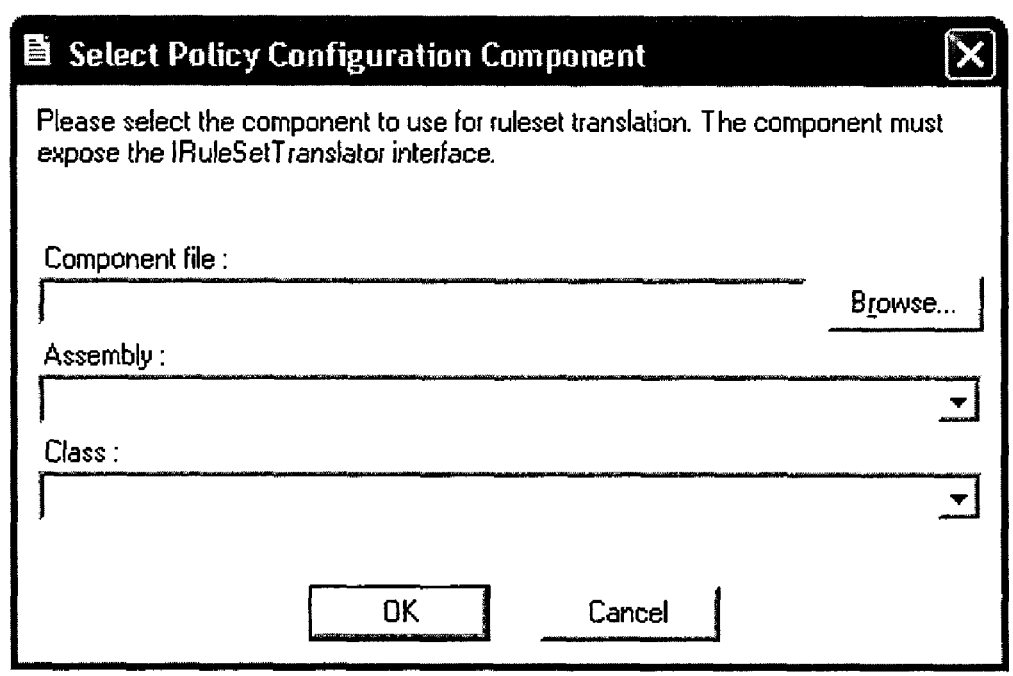
FIG. 44 is an exemplary user interface in accordance with an aspect of the present invention.
Figure 45:
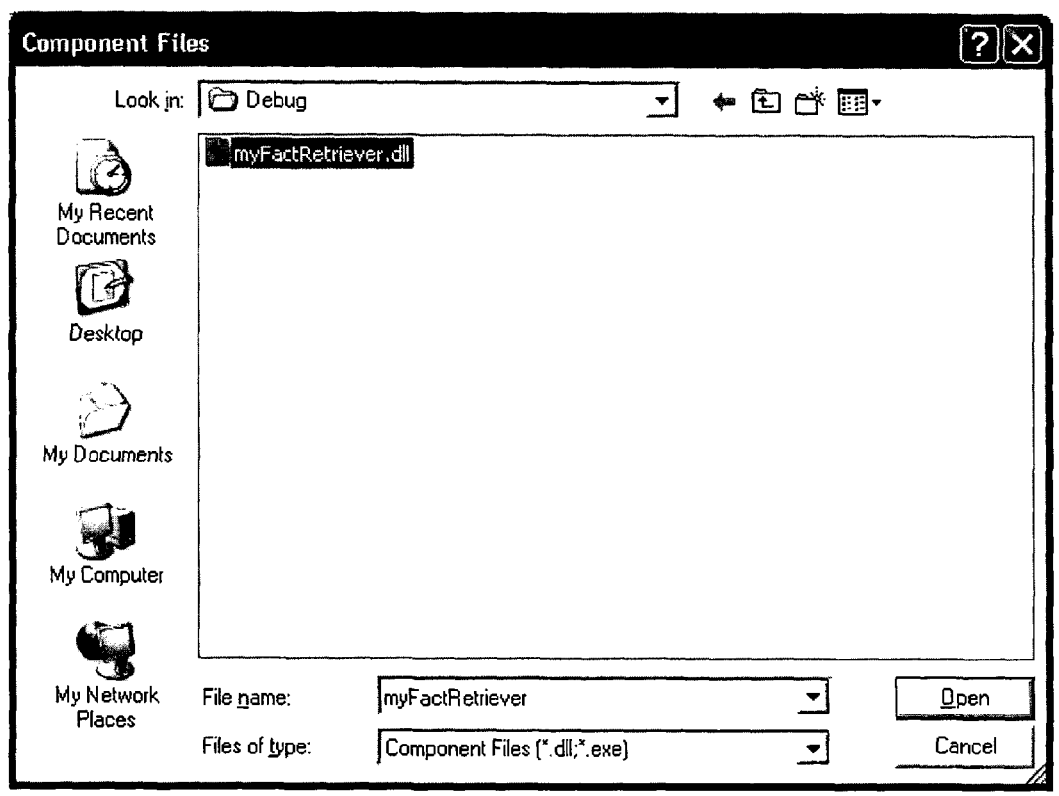
FIG. 45 is an exemplary user interface in accordance with an aspect of the present invention.

Next, as illustrated in FIG. 43, in this example, rules are implemented for:
Negation of Income status rule
Employment status rule
If
  Time of employment in months is greater than 18
Then
  Set employment status in the coming case document to be valid
Negation of Employment status rule
Residency status rule
If
  Time of residency in years is greater than 3
Then
  Set residency status in the coming case document to be valid
Negation of Residency status rule Next, in order to specify the FactRetriever for "LoanProcessing version 1.0" policy, a user:
(1) Selects "LoanProcessing→Version 1.0 policy" in "Policy Explorer"
(2) Goes to Property Window and clicks FactRetriever property button on the left, a dialog box 4400 as illustrated in FIG. 44 appears.

The user then:
(1) Clicks "Browse", and the Component File 4500 illustrated in FIG. 45 appears.
(2) Selects Loans Processing using Business Rules\myFactRetriever\bin\Debug\myFactRetriever.dll, and, clicks Open The user the selects the class in the Class dropdown list that implements a FactRetriever interface, and, clicks "OK".

Figure 46:
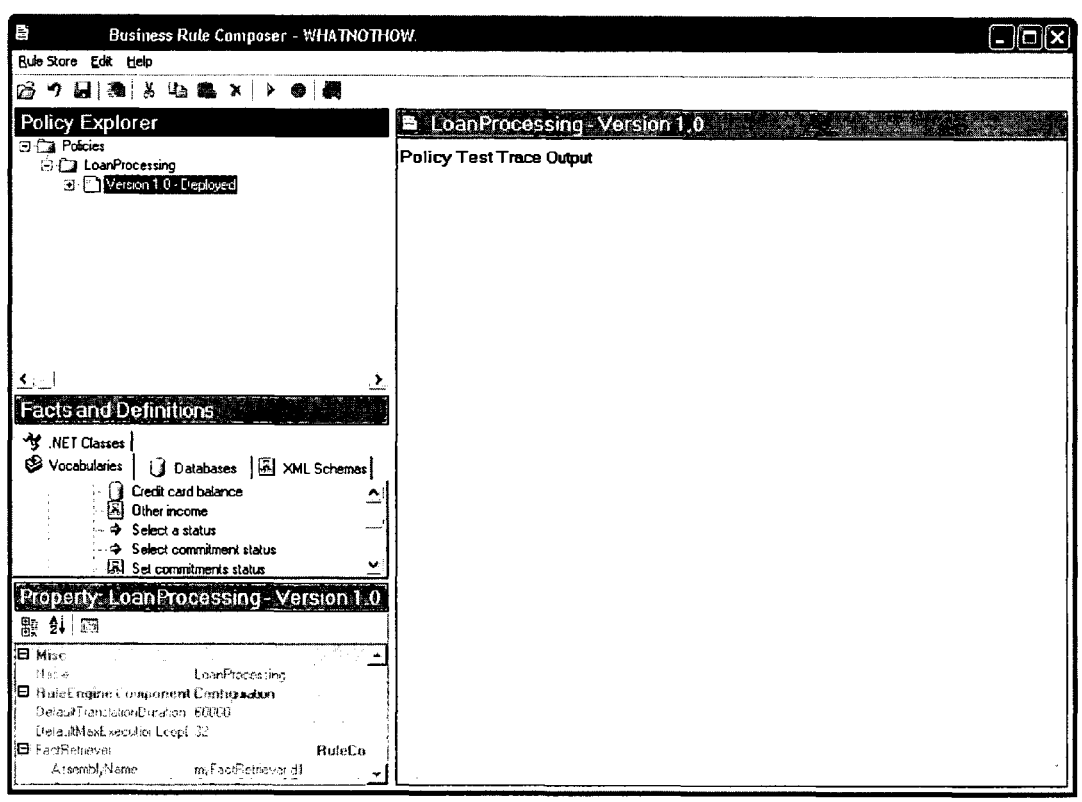
FIG. 46 is an exemplary user interface in accordance with an aspect of the present invention.

Referring to FIG. 46, in order to Publish and Deploy the policy version, the user:
(1) Right clicks "LoanProcessing→Version 1.0", and, selects "Publish"
(2) Right clicks "LoanProcessing→Version 1.0", and, selects "Deploy"

Figure 47:
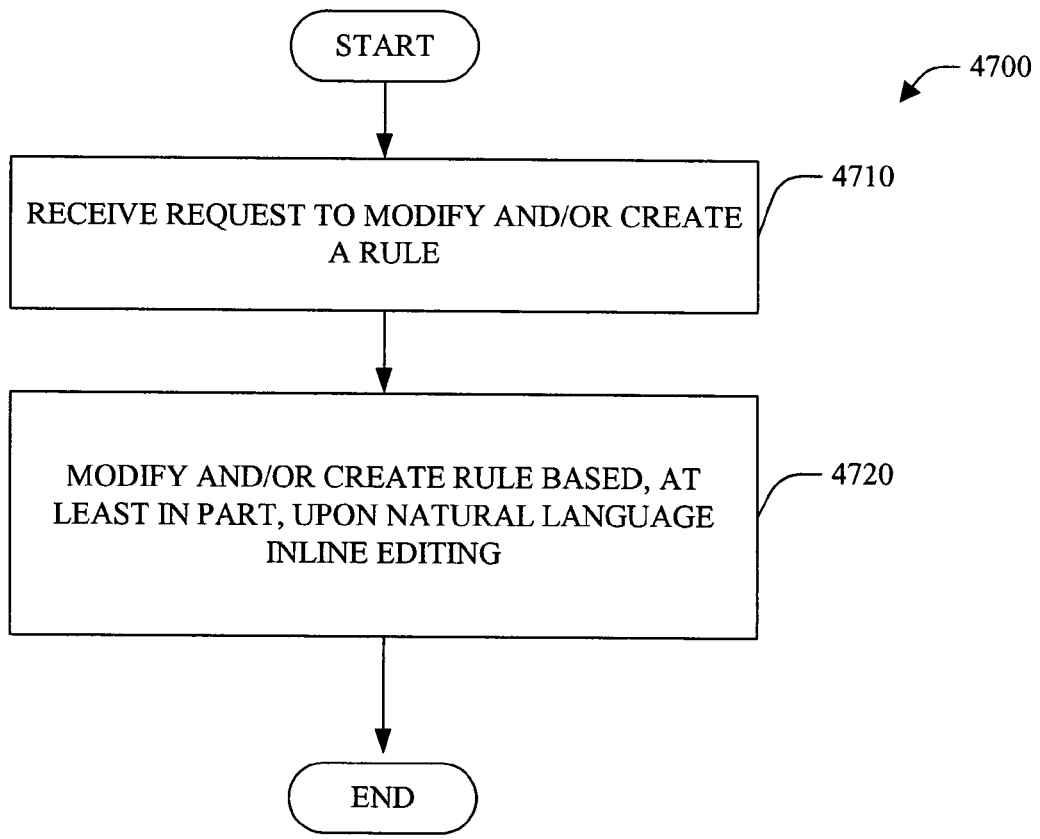
FIG. 47 is a flow chart of a method facilitating rule composition in accordance with an aspect of the present invention.

Turning briefly to FIG. 47 a methodology that may be implemented in accordance with the present invention is illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 47, a method 4700 facilitating rule composition in accordance with an aspect of the present invention is illustrated. At 4710, a request modify and/or create a rule is received (e.g., from a user). At 4720, the rule is modified and/or created based, at least in part, upon natural language inline editing.

Figure 48:
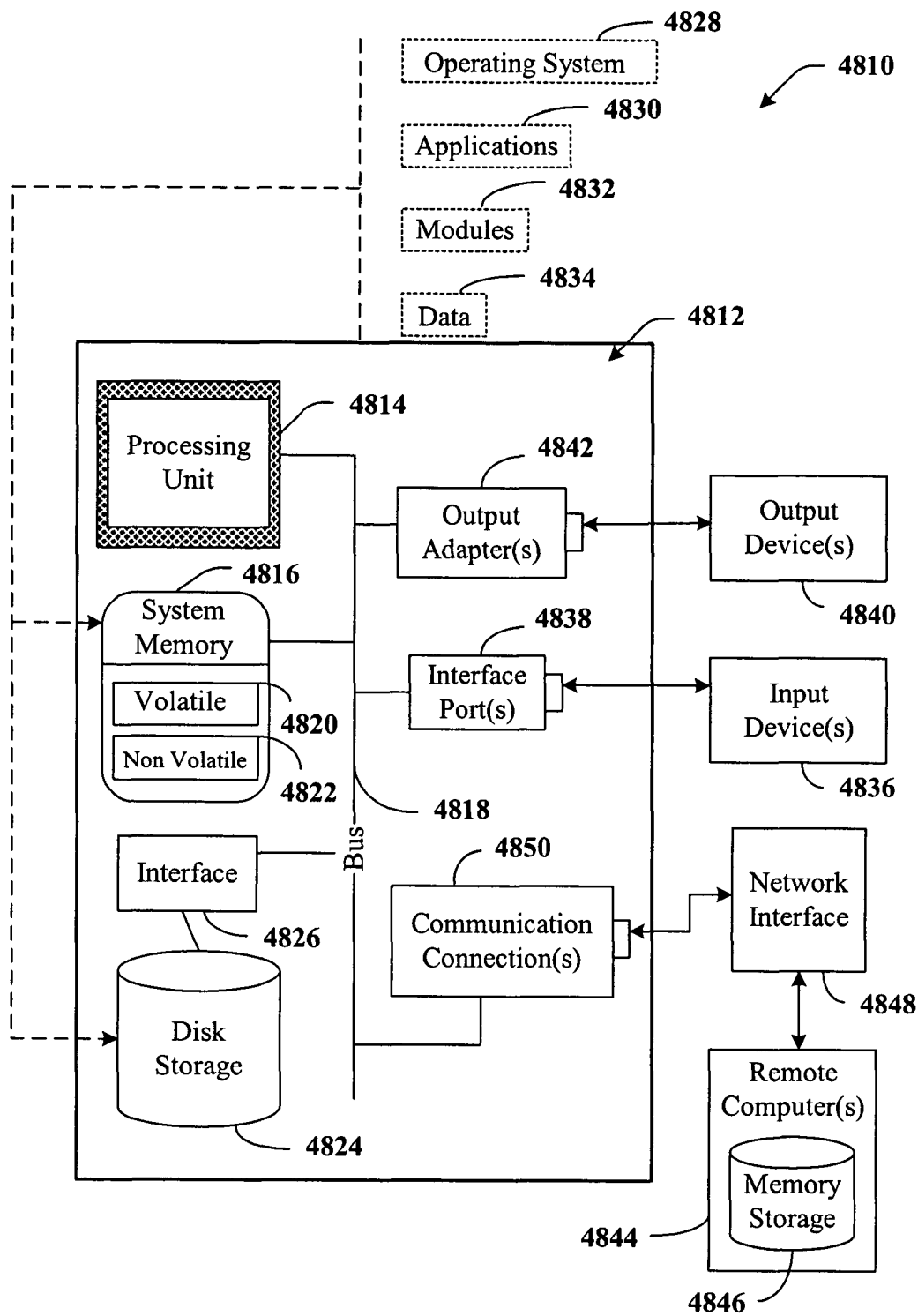
FIG. 48 illustrates an example operating environment in which the present invention may function.

In order to provide additional context for various aspects of the present invention, FIG. 48 and the following discussion are intended to provide a brief, general description of a suitable operating environment 4810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 4810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 48, an exemplary environment 4810 for implementing various aspects of the invention includes a computer 4812. The computer 4812 includes a processing unit 4814, a system memory 4816, and a system bus 4818. The system bus 4818 couples system components including, but not limited to, the system memory 4816 to the processing unit 4814. The processing unit 4814 can be any of various available processors. Dual microprocessors and other multiprocessor architectures also can be employed as the processing unit 4814.

The system bus 4818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 4816 includes volatile memory 4820 and nonvolatile memory 4822. The basic input/output system (BIOS), containing the basic routines to transfer information between elements within the computer 4812, such as during start-up, is stored in nonvolatile memory 4822. By way of illustration, and not limitation, nonvolatile memory 4822 can include read only memory (ROM), programmable ROM (PROM), electrically programmable ROM (EPROM), electrically erasable ROM (EEPROM), or flash memory. Volatile memory 4820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 4812 also includes removable/nonremovable, volatile/nonvolatile computer storage media. FIG. 48 illustrates, for example a disk storage 4824. Disk storage 4824 includes, but is not limited to, devices like a magnetic disk drive, floppy disk drive, tape drive, Jaz drive, Zip drive, LS-100 drive, flash memory card, or memory stick. In addition, disk storage 4824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 4824 to the system bus 4818, a removable or non-removable interface is typically used such as interface 4826.

It is to be appreciated that FIG. 48 describes software that acts as an intermediary between users and the basic computer resources described in suitable operating environment 4810. Such software includes an operating system 4828. Operating system 4828, which can be stored on disk storage 4824, acts to control and allocate resources of the computer system 4812. System applications 4830 take advantage of the management of resources by operating system 4828 through program modules 4832 and program data 4834 stored either in system memory 4816 or on disk storage 4824. It is to be appreciated that the present invention can be implemented with various operating systems or combinations of operating systems.

A user enters commands or information into the computer 4812 through input device(s) 4836. Input devices 4836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 4814 through the system bus 4818 via interface port(s) 4838. Interface port(s) 4838 include, for example, a serial port, a parallel port, a game port, and a universal serial bus (USB). Output device(s) 4840 use some of the same type of ports as input device(s) 4836. Thus, for example, a USB port may be used to provide input to computer 4812, and to output information from computer 4812 to an output device 4840. Output adapter 4842 is provided to illustrate that there are some output devices 4840 like monitors, speakers, and printers among other output devices 4840 that require special adapters. The output adapters 4842 include, by way of illustration and not limitation, video and sound cards that provide a means of connection between the output device 4840 and the system bus 4818. It should be noted that other devices and/or systems of devices provide both input and output capabilities such as remote computer(s) 4844.

Computer 4812 can operate in a networked environment using logical connections to one or more remote computers, such as remote computer(s) 4844. The remote computer(s) 4844 can be a personal computer, a server, a router, a network PC, a workstation, a microprocessor based appliance, a peer device or other common network node and the like, and typically includes many or all of the elements described relative to computer 4812. For purposes of brevity, only a memory storage device 4846 is illustrated with remote computer(s) 4844. Remote computer(s) 4844 is logically connected to computer 4812 through a network interface 4848 and then physically connected via communication connection 4850. Network interface 4848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 4850 refers to the hardware/software employed to connect the network interface 4848 to the bus 4818. While communication connection 4850 is shown for illustrative clarity inside computer 4812, it can also be external to computer 4812. The hardware/software necessary for connection to the network interface 4848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system facilitating rule composition comprising:
   a processor communicatively coupled to a computer readable medium having stored thereon a rule composer that in response to a user input facilitates at least one of creation and modification of a rule, the rule composer further receiving information associated with the at least one of creation and modification of the rule based, at least in part, upon natural language inline editing; and,
   a display component that displays the rule in a tree structure, the tree structure including a first node for the conditions of the rule and a second node for the actions of the rule, wherein the first node includes one or more sub-nodes that each define either an AND, OR, or NOT logical relationship.

2. The system of claim 1, further comprising an input component that facilitates receipt of information associated with the at least one of creation and modification of the rule.

3. The system of claim 1, the rule being a business rule.

4. The system of claim 1, the rule being based, at least in part, upon a parameterized format string definition.

5. The system of claim 1, the rule being based, at least in part, upon a composable vocabulary definition.

6. The system of claim 1, wherein the first node is displayed in a first splitting panel of a user interface, and the second node is displayed in a second splitting panel of the user interface.

7. The system of claim 1, wherein the display component also displays a property window that displays a property of a node of the tree structure.

8. The system of claim 1, wherein the display component also displays a context menu associated with at least one of an action and a condition associated with the rule.

9. The system of claim 1, the rule composer comprising a rule editor and a policy explorer.

10. The system of claim 1, the rule composer facilitating editing of a parameter having a range.

11. The system of claim 1, the rule composer facilitating editing of an unconstrained parameter.

12. The system of claim 1, the rule composer facilitating editing of a parameter having a value in a set of values.

13. The system of claim 1, the rule composer facilitating type compatibility checking.

14. The system of claim 1, the rule composer facilitating error checking and providing error information to the display component if an error is found.

15. A method, performed by a computer, for displaying and editing a business rule comprising:
   displaying, on a display device of a computer, a tree structure having a first node for defining conditions of a business rule, and second node for defining actions to be taken when the conditions of the business rule are satisfied;
   receiving user input that selects a first logical relationship to add to the first node of the tree structure, the first logical relationship comprising one of an AND, OR, or NOT logical relationship;
   creating a first sub-node under the first node of the tree structure that defines the first logical relationship;
   receiving user input that specifies one or more conditions to add to the first sub-node;
   adding the one or more conditions to the first sub-node;
   receiving user input that specifies one or more actions of the business rule; and
   adding the actions to the second node of the tree structure.

16. The method of claim 15, further comprising:
   receiving user input that selects a second logical relationship to add to the first sub-node, the second logical relationship comprising one of an AND, OR, or NOT logical relationship;
   creating a second sub-node under the first sub-node that defines the second logical relationship;
   receiving user input that specifies one or more conditions to add to the second sub-node; and
   adding the one or more conditions to the second sub-node.

17. The method of claim 16, wherein the first logical relationship is an AND logical relationship, and the second logical relationship is an OR logical relationship.

18. The method of claim 15, wherein each of the one or more conditions comprises a vocabulary definition and one or more parameters.

19. The method of claim 18, wherein receiving user input that specifies one or more conditions to add to the first sub-node comprises:
   receiving a drag and drop operation that drags and drops the vocabulary definition and the one or more parameters to the first sub-node.

20. The method of claim 15, further comprising displaying a prompt string under the first node that prompts the user to provide the user input that specifies the one or more conditions to add to the first node.

21. The method of claim 20, further comprising replacing the prompt string with the user input received that specifies the one or more conditions to add to the first sub-node.

22. The method of claim 18, further comprising type checking the one or more parameters.

23. A computer storage medium storing computer executable instructions which when executed by a process of a computer performs a method for creating and editing a business rule comprising:
   displaying, on a display device of a computer, a tree structure having a first node for defining conditions of a business rule, and second node for defining actions to be taken when the conditions of the business rule are satisfied;
   receiving user input that selects a first logical relationship to add to the first node of the tree structure, the first logical relationship comprising one of an AND, OR, or NOT logical relationship;
   creating a first sub-node under the first node of the tree structure that defines the first logical relationship;
   receiving user input that specifies one or more conditions to add to the first sub-node;
   adding the one or more conditions to the first sub-node;
   receiving user input that specifies one or more actions of the business rule; and
   adding the actions to the second node of the tree structure.

24. The computer storage medium of claim 23, further comprising:
   receiving user input that selects a second logical relationship to add to the first sub-node, the second logical relationship comprising one of an AND, OR, or NOT logical relationship;
   creating a second sub-node under the first sub-node that defines the second logical relationship;
   receiving user input that specifies one or more conditions to add to the second sub-node; and
   adding the one or more conditions to the second sub-node.

25. The computer storage medium of claim 24, wherein the first logical relationship is an AND logical relationship, and the second logical relationship is an OR logical relationship.

26. The computer storage medium of claim 23, wherein each of the one or more conditions comprises a vocabulary definition and one or more parameters.

27. The computer storage medium of claim 26, wherein receiving user input that specifies one or more conditions to add to the first sub-node comprises:
   receiving a drag and drop operation that drags and drops the vocabulary definition and the one or more parameters to the first sub-node.

28. The computer storage medium of claim 23, further comprising displaying a prompt string under the first node that prompts the user to provide the user input that specifies the one or more conditions to add to the first node.

29. The computer storage medium of claim 28, further comprising replacing the prompt string with the user input received that specifies the one or more conditions to add to the first sub-node.

30. The computer storage medium of claim 26, further comprising type checking the one or more parameters.

* * * * *